(12) United States Patent
Guccione et al.

(10) Patent No.: US 10,451,054 B2
(45) Date of Patent: Oct. 22, 2019

(54) PUMP ASSEMBLY

(71) Applicant: MONKEY PUMPS, LLC, Harvey, LA (US)

(72) Inventors: Ray Guccione, Waggaman, LA (US); Richard Marcis, Kansas City, MO (US)

(73) Assignee: Monkey Pumps, LLC, Harvey, LA (US)

( * ) Notice: Subject to any disclaimer, the term of this patent is extended or adjusted under 35 U.S.C. 154(b) by 120 days.

(21) Appl. No.: 15/687,720

(22) Filed: Aug. 28, 2017

(65) Prior Publication Data

US 2017/0356436 A1    Dec. 14, 2017

Related U.S. Application Data

(63) Continuation-in-part of application No. 14/856,977, filed on Sep. 17, 2015, now Pat. No. 10,161,396.

(51) Int. Cl.

| | |
|---|---|
| F04B 49/22 | (2006.01) |
| F04B 9/123 | (2006.01) |
| F04B 9/103 | (2006.01) |
| F04B 19/22 | (2006.01) |
| F04B 35/00 | (2006.01) |
| F16K 11/22 | (2006.01) |
| F04B 9/12 | (2006.01) |
| F04B 9/125 | (2006.01) |
| F04B 53/14 | (2006.01) |

(52) U.S. Cl.
CPC .............. *F04B 49/22* (2013.01); *F04B 9/103* (2013.01); *F04B 9/12* (2013.01); *F04B 9/123* (2013.01); *F04B 9/125* (2013.01); *F04B 19/22* (2013.01); *F04B 35/00* (2013.01); *F04B 53/14* (2013.01); *F04B 53/143* (2013.01); *F16K 11/22* (2013.01)

(58) Field of Classification Search
CPC ....... F04B 49/22; F04B 49/103; F04B 49/125
USPC .......................................................... 91/281
See application file for complete search history.

(56) References Cited

U.S. PATENT DOCUMENTS

| | | | |
|---|---|---|---|
| 4,593,712 A | 6/1986 | Quartana, III | |
| 4,776,773 A | 10/1988 | Quartana, III | |
| 5,468,127 A | 11/1995 | Elliott et al. | |
| 8,087,345 B2 * | 1/2012 | Singer | F01L 1/46 91/305 |

* cited by examiner

*Primary Examiner* — Michael Leslie
*Assistant Examiner* — Daniel S Collins
(74) *Attorney, Agent, or Firm* — Hankin Patent Law, APC; Kevin Schraven; Anooj Patel

(57) ABSTRACT

A pump assembly. The pump assembly may comprise a motor portion for driving a fluid pumping portion via a piston. The motor portion may comprise: a spool and a spool housing assembly having a spool chamber. The spool may be disposed within the spool chamber. The spool may comprise an upper portion and a lower portion, wherein the diameter of the lower portion is larger than the diameter of the upper portion. The spool may also comprise: (1) two support groove portions for cradling two slide valves and (2) two spool bores, which are in fluid communication with the two slide valves. The piston of the pump assembly may comprise a valve stem having a valve stem bore and valve stem openings. The valve stem openings may be funnel-shaped or may inwardly slope into the valve stem bore to prevent or minimize cutting or shredding of a blown seal.

29 Claims, 27 Drawing Sheets

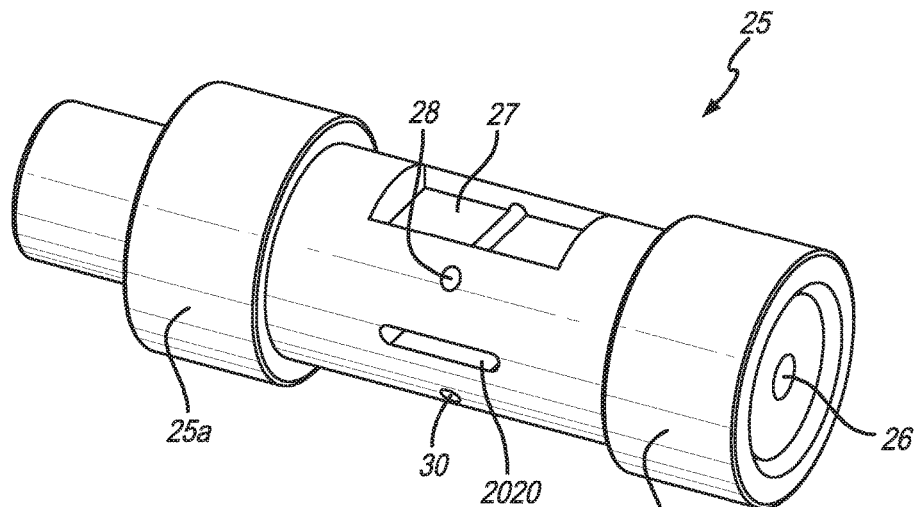
FIG. 3
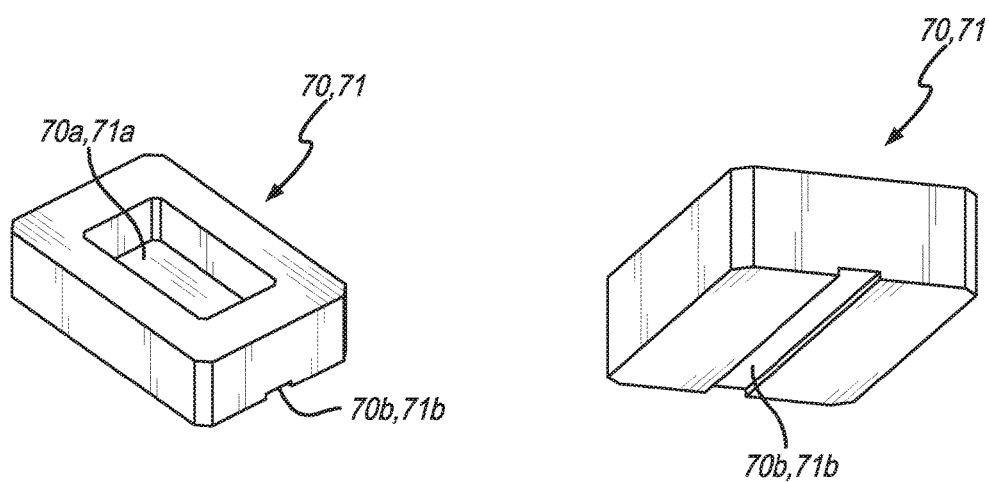
FIG. 4A
FIG. 4B

PUMP ASSEMBLY

CROSS-REFERENCE TO RELATED APPLICATIONS

The Application is a continuation-in-part of U.S. Non-Provisional patent application Ser. No. 14/856,977, filed on Sep. 17, 2015, titled "Zero Emission Reciprocating Drive Pump", by inventors Ray Guccione and Richard Marcis, the contents of which are expressly incorporated herein by this reference, and to which priority is claimed.

FIELD OF USE

The present disclosure relates generally to fluid pumping systems and, more particularly, to fluid pumping systems with a new and improved spool valve and piston for minimizing stalling and shredding of the seals or O-rings.

BACKGROUND

In general, gas dehydrating systems are designed to remove water vapor from a natural gas stream. Such systems typically comprise a separator that receives liquids from water vapor laden gas, an absorber (or contactor) for removing water vapor from the wet gas, and a pump (e.g., glycol pump) for circulating a dehydrating agent (e.g., glycol) within the system. The glycol is generally supplied to the absorber in a "dry" low water vapor pressure condition and is removed from the absorber in a "wet" high water vapor pressure condition (i.e., "rich glycol"). This wet glycol is then continuously-removed from the absorber and circulated through a reboiler for removing the absorbed water from the glycol. By removing water vapor from the wet gas, dry gas suitable for commercial usage is created.

The pressure created from gas streams and natural gas wells is highly variable, and given that gas operated pumps often require large amounts of energy, changes in gas pressures during day-to-day operation might cause conventional glycol pumps to stall. As a result, the stalling of the glycol pumps might limit the pressure needed for circulating glycol within a system. This stalling might also limit the pumping pressure applied to the motor end of the pumps, and the output pressure of the pumped liquid materials.

Importantly, under certain conditions where the piston seals are blown during pumping, the piston seals may come into contact with the vent holes of the piston rod of these pumps. This in turn may cause the seals to be cut, damaged, or even shredded, as the piston rod reciprocates back and forth. Thus, piston seals may also be subject to abrasion and wear. As such, a need exists for a new and improved pump assembly to address the foregoing limitations.

SUMMARY OF EMBODIMENTS

To minimize the limitations in the prior art, and to minimize other limitations that will become apparent upon reading and understanding the present disclosure, the present specification discloses a new and improved pump assembly.

One embodiment may be a pump assembly, comprising: a motor portion; wherein the motor portion may comprise: a spool and a spool housing assembly having a spool chamber; wherein the spool may be disposed in and reciprocally movable within the spool chamber and may comprise an upper portion and a lower portion; wherein the spool housing assembly may comprise: a first seal and a second seal; wherein, when the spool is disposed within the spool chamber of the spool housing assembly, the first seal and the second seal may divide the spool chamber into a proximal chamber, a supply chamber, and a distal chamber, respectively, such that: (i) the first seal may divide the spool chamber into the proximal chamber and the supply chamber; and (ii) the second seal may divide the spool chamber into the supply chamber and the distal chamber; and wherein a diameter of a lower portion of the spool may be larger than a diameter of an upper portion of the spool. The diameter of the lower portion of the spool may be between approximately 3 to 8 percent larger than the diameter of the upper portion of the spool. The diameter of the lower portion of the spool may be approximately 4 percent larger than the diameter of the upper portion of the spool. The spool may comprise a first support groove portion adapted to cradle a first slide valve; and wherein a width of the first support groove portion may be approximately the same as a width of the first slide valve, such that the first support groove portion substantially prevents the first slide valve from moving laterally within the first support groove portion. The spool may comprise a first spool bore; and wherein the first spool bore may traverse laterally through the first support groove portion, such that the first slide valve is in fluid communication with the first spool bore when the first support groove cradles the first slide valve. A length of the first support groove portion may be longer than a length of the first slide valve, such that the first support groove portion allows the first slide valve to move longitudinally within the first support groove portion. The spool may comprise a second support groove portion adapted to cradle a second slide valve; and wherein a width and a length of the second support groove portion may be approximately the same as a width and a length of the second slide valve, such that the second support groove portion prevents the second slide valve from moving either laterally or longitudinally within the second support groove portion. The spool may comprise a second spool bore; and wherein the second spool bore may traverse laterally through the second support groove portion, such that the second slide valve is in fluid communication with the second spool bore when the second support groove cradles the second slide valve. The spool may comprise a center bore that is adapted to moveably receive a valve stem of a piston of the pump assembly, the center bore being in fluid communication with the distal chamber of the spool housing assembly; wherein the valve stem may comprise a valve stem bore and one or more valve stem openings; wherein the one or more valve stem openings may be tapered such that a shape of the one or more valve stem openings inwardly slopes into the valve stem bore; and wherein the center bore, the valve stem bore, and the one or more valve stem openings may be in fluid communication with each other.

Another embodiment may be a pump assembly, comprising: a motor portion adapted to drive a fluid pumping portion via a piston; wherein the motor portion may comprise: a spool and a spool housing assembly having a spool chamber; wherein the spool may be disposed in and reciprocally movable within the spool chamber and may comprise an upper portion and a lower portion; wherein the spool housing assembly may comprise: a first seal and a second seal; wherein the first seal may be located inside the spool chamber and may be disposed between the lower portion of the spool and the spool housing assembly; wherein the second seal may be located inside the spool chamber and may be disposed between the upper portion of the spool and the spool housing assembly; wherein, when the spool is disposed within the spool chamber of the spool housing assembly, the first seal and the second seal may divide the spool chamber into a proximal chamber, a supply chamber, and a distal chamber, respectively, such that: (i) the first seal may divide the spool chamber into the proximal chamber and the supply chamber; and (ii) the second seal may divide the spool chamber into the supply chamber and the distal chamber; and wherein a diameter of a lower portion of the spool may be larger than a diameter of an upper portion of the spool. The diameter of the lower portion of the spool may be between approximately 3 to 8 percent larger than the diameter of the upper portion of the spool. The diameter of the lower portion of the spool may be approximately 4 percent larger than the diameter of the upper portion of the spool. The spool may comprise a first support groove portion adapted to cradle a first slide valve; and wherein a width of the first support groove portion may be approximately the same as a width of the first slide valve, such that the first support groove portion substantially prevents the first slide valve from moving laterally within the first support groove portion. The spool may comprise a first spool bore; and wherein the first spool bore may traverse laterally through the first support groove portion, such that the first slide valve is in fluid communication with the first spool bore when the first support groove cradles the first slide valve. A length of the first support groove portion may be longer than a length of the first slide valve, such that the first support groove portion allows the first slide valve to move longitudinally within the first support groove portion. The spool may comprise a second support groove portion adapted to cradle a second slide valve; and wherein a width and a length of the second support groove portion may be approximately the same as a width and a length of the second slide valve, such that the second support groove portion prevents the second slide valve from moving either laterally or longitudinally within the second support groove portion. The spool may comprise a second spool bore; and wherein the second spool bore may traverse laterally through the second support groove portion, such that the second slide valve is in fluid communication with the second spool bore when the second support groove cradles the second slide valve. The spool may comprise a center bore that is adapted to moveably receive a valve stem of the piston, the center bore being in fluid communication with the distal chamber of the spool housing assembly; wherein the valve stem may comprise a valve stem bore and one or more valve stem openings; wherein the one or more valve stem openings may be tapered, such that a shape of the one or more valve stem openings inwardly slopes into the valve stem bore; and wherein the center bore, the valve stem bore, and the one or more valve stem openings may be in fluid communication with each other. The spool may comprise a spool seal located near a lower portion of the spool; wherein the spool seal may be disposed between the valve stem of the piston and the lower portion of the spool; and wherein the one or more valve stem openings of the valve stem may be adapted to never contact and pass the spool seal when the valve stem reciprocally moves within the center bore of the spool.

Another embodiment may be a pump assembly, comprising: a motor portion and a fluid pumping portion; wherein the motor portion may be adapted to drive the fluid pumping portion via a piston; wherein the motor portion may comprise: a spool and a spool housing assembly having a spool chamber; wherein the spool may be disposed in and reciprocally movable within the spool chamber and may comprise an upper portion and a lower portion; wherein the spool housing assembly may comprise: a first seal and a second seal; wherein the first seal may be located inside the spool chamber and may be disposed between the lower portion of the spool and the spool housing assembly; wherein the second seal may be located inside the spool chamber and may be disposed between the upper portion of the spool and the spool housing assembly; wherein, when the spool is disposed within the spool chamber of the spool housing assembly, the first seal and the second seal may divide the spool chamber into a proximal chamber, a supply chamber, and a distal chamber, respectively, such that: (i) the first seal may divide the spool chamber into the proximal chamber and the supply chamber; and (ii) the second seal may divide the spool chamber into the supply chamber and the distal chamber; and wherein the diameter of the lower portion of the spool may be approximately 4 percent larger than the diameter of the upper portion of the spool; wherein the spool may comprise a first support groove portion, a second support groove portion, a first spool bore, and a second spool bore; wherein the first support groove portion may be adapted to cradle a first slide valve; wherein a width of the first support groove portion may be approximately the same as a width of the first slide valve, such that the first support groove portion may substantially prevent the first slide valve from moving laterally within the first support groove portion; wherein a length of the first support groove portion may be longer than a length of the first slide valve, such that the first support groove portion allows the first slide valve to move longitudinally within the first support groove portion; wherein the first spool bore may traverse laterally through the first support groove portion, such that the first slide valve is in fluid communication with the first spool bore when the first support groove cradles the first slide valve; wherein the second support groove portion may be adapted to cradle a second slide valve; wherein a width and a length of the second support groove portion may be approximately the same as a width and a length of the second slide valve, such that the second support groove portion prevents the second slide valve from moving either laterally or longitudinally within the second support groove portion; wherein the second spool bore may traverse laterally through the second support groove portion, such that the second slide valve is in fluid communication with the second spool bore when the second support groove cradles the second slide valve; wherein the spool may comprise a center bore and a spool seal; wherein the center bore of the spool may be adapted to moveably receive a valve stem of the piston, the center bore being in fluid communication with the distal chamber of the spool housing assembly; wherein the valve stem may comprise a valve stem bore and one or more valve stem openings; wherein the one or more valve stem openings may be tapered, such that a shape of the one or more valve stem openings inwardly slopes into the valve stem bore; wherein the center bore, the valve stem bore, and the one or more valve stem openings may be in fluid communication with each other; wherein the spool seal may be located near a lower portion of the spool; wherein the spool seal may be disposed between the valve stem of the piston and the lower portion of the spool; and wherein the one or more valve stem openings of the valve stem may be adapted to never contact and pass the spool seal when the valve stem reciprocally moves within the center bore of the spool.

A pump assembly, comprising: a motor portion; wherein the motor portion comprises: a spool and a spool housing assembly; wherein the spool housing assembly comprises: a first seal, a second seal, a spool chamber, and a ported wear plate; wherein the spool is disposed in and reciprocally movable within the spool chamber and comprises an upper portion and a lower portion; wherein, when the spool is disposed within the spool chamber of spool housing assembly, the first seal and the second seal divide the spool chamber into a proximal chamber, a supply chamber, and a distal chamber, respectively, such that: the first seal divides the spool chamber into the proximal chamber and the supply chamber; and the second seal divides the spool chamber into the supply chamber and the distal chamber; and wherein the spool comprises a first support groove portion adapted to cradle a first slide valve; wherein a width of the first support groove portion is approximately the same as a width of the first slide valve, such that the first support groove portion substantially prevents the first slide valve from moving laterally within the first support groove portion; wherein a length of the first support groove portion is longer than a length of the first slide valve, such that the first support groove portion allows the first slide valve to move longitudinally within the first support groove portion; wherein the first slide valve moves longitudinally against the ported wear plate; and wherein the ported wear plate comprises one or more stop portions that prevent the first slide valve from being out of position relative to the ported wear plate. The spool may comprise a first spool bore, which may traverse laterally through the first support groove portion, such that the first slide valve may be in fluid communication with the first spool bore when the first support groove cradles the first slide valve. The spool may comprise a second support groove portion adapted to cradle a second slide valve; and wherein a width and a length of the second support groove portion may be approximately the same as a width and a length of the second slide valve, such that the second support groove portion may prevent the second slide valve from moving either laterally or longitudinally within the second support groove portion. The spool may comprise a second spool bore; and wherein the second spool bore may traverse laterally through the second support groove portion, such that the second slide valve is in fluid communication with the second spool bore when the second support groove cradles the second slide valve. The diameter of a lower portion of the spool may be larger than a diameter of an upper portion of the spool. The diameter of the lower portion of the spool may be between approximately 3 to 8 percent larger than the diameter of the upper portion of the spool. The diameter of the lower portion of the spool may be approximately 4 percent larger than the diameter of the upper portion of the spool.

In a preferred embodiment, the present disclosure may provide a spool having a larger diameter on the lower portion of the spool, as compared to the upper portion of the spool. For example, in one embodiment, the lower portion of the spool may be approximately 4% diametrically larger than the upper portion of the spool. This preferably creates a 7.3% larger surface area that forces the spool downwards when first supplying control fluid to start the cycling process. The purpose is to ensure that the pump assembly does not stall during start up and to aid in the process of blowing down the spool during normal cycling.

In a preferred embodiment, the present disclosure may provide a spool having one or more support groove portions adapted to guide and cradle the one or more slide valves. Preferably, these support groove are machined and are integrated to the spool to minimize costs and complexity. Importantly, the spool may also comprise spool bores that preferably extends or traverses laterally through the support groove portions. This allows the slide valves to be in fluid communication with the spool bores when the support grooves support or cradle the slide valves. These bores may provide quick fluid access to the flat, underside of the slide valves to "activated" quickly against the spool housing assembly.

In a preferred embodiment, the present disclosure may provide a valve stem with valve stem openings that are funnel-shaped or ramped, such that a shape of valve stem openings inwardly slope into the valve stem bore. This helps prevent the valve stem openings from cutting or shredding the seals of the pump assembly.

It is an object to overcome the deficiencies of the prior art.

These, as well as other components, steps, features, objects, benefits, and advantages, will now become clear from a review of the following detailed description of illustrative embodiments, of the accompanying drawings, and of the claims.

BRIEF DESCRIPTION OF THE ILLUSTRATIVE EMBODIMENTS

The drawings show illustrative embodiments, but do not depict all embodiments. Other embodiments may be used in addition to or instead of the illustrative embodiments. Details that may be apparent or unnecessary may be omitted for the purpose of saving space or for more effective illustrations. Some embodiments may be practiced with additional components or steps and/or without some or all components or steps provided in the illustrations. When different drawings contain the same numeral, that numeral refers to the same or similar components or steps.

FIG. 3 is an illustration of a perspective view of one embodiment of the spool.

FIGS. 4A and 4B are illustrations of perspective views of one embodiment of the slide valves.

DETAILED DESCRIPTION OF THE ILLUSTRATIVE EMBODIMENTS

Figure 1:
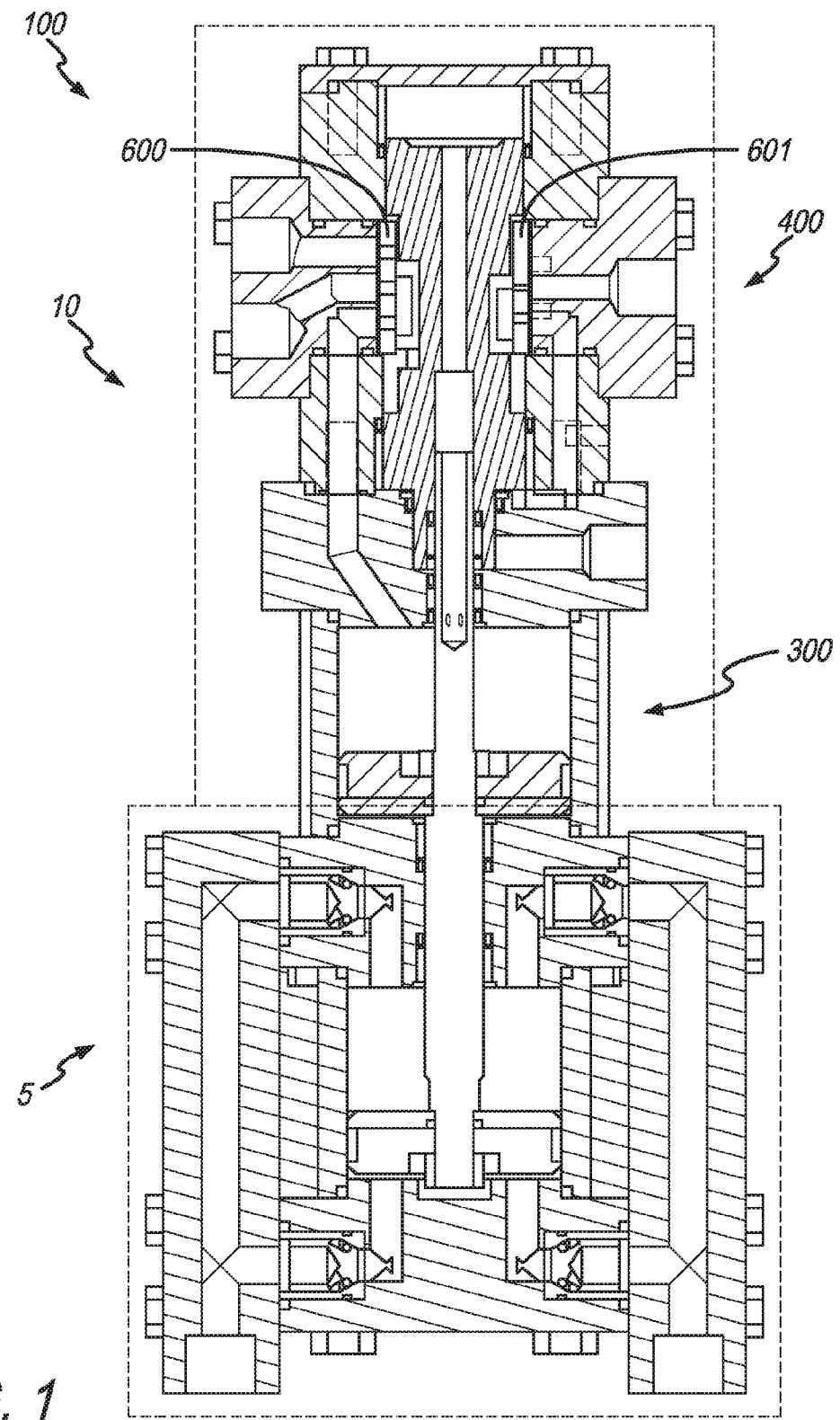
FIG. 1 is an illustration of a cross-section view of one embodiment of a pump assembly.

In the following detailed description, numerous specific details are set forth in order to provide a thorough understanding of various aspects of the embodiments. However, the embodiments may be practiced without some or all of these specific details. In other instances, well-known procedures and/or components have not been described in detail so as not to unnecessarily obscure aspects of the embodiments.

While some embodiments are disclosed here, other embodiments will become obvious to those skilled in the art as a result of the following detailed description. These embodiments are capable of modifications of various obvious aspects, all without departing from the spirit and scope of protection. The Figures, and their detailed descriptions, are to be regarded as illustrative in nature and not restrictive. Also, the reference or non-reference to a particular embodiment shall not be interpreted to limit the scope of protection.

In the following description, certain terminology is used to describe certain features of one or more embodiments. For purposes of the specification, unless otherwise specified, the terms "pump", "pump assembly", and "drive pump", as used herein, refer to any mechanical device that raises, transfers, delivers, or compresses fluids or that attenuates gases especially by suction or pressure or both.

As used herein, the terms "approximately" and "about" generally refer to a deviance of within 5% of the indicated number or range of numbers. In one embodiment, the term "approximately" and "about", may refer to a deviance of between 0.001-10% from the indicated number or range of numbers.

In the following description, certain terminology is used to describe certain features of one or more embodiments. For purposes of the specification, unless otherwise specified, the term "substantially" refers to the complete or nearly complete extent or degree of an action, characteristic, property, state, structure, item, group of items, or result. For example, in one embodiment, an object that is "substantially" located within a housing would mean that the object is either completely within a housing or nearly completely within a housing. The exact allowable degree of deviation from absolute completeness may in some cases depend on the specific context. However, generally speaking, the nearness of completion will be so as to have the same overall result as if absolute and total completion were obtained. The use of "substantially" is also equally applicable when used in a negative connotation to refer to the complete or near complete lack of an action, characteristic, property, state, structure, item, group of items, or result. In another example, substantially all of a group of items, may include all of the items of that group, or at least all of the items of that group that re generally within the normal parameters for the items. To the extent that the group of items might include members that far exceed the normal parameters, this abnormal item might not expected to be part of substantially all the group of items.

FIG. 1 is an illustration of a cross-section view of one embodiment of a pump assembly. As shown in FIG. 1, one embodiment of the pump assembly 100 may comprise: a fluid pumping portion 5 and a motor portion 10. The fluid pumping portion 5 is preferably used for pumping fluids, liquids, or gases. The motor portion 10 may comprise a spool valve 400 for driving the fluid pumping portion 5. The motor portion 10 may comprise a spool-type valve rod operatively coupled to a piston 300 to regulate the fluid pumping action of the fluid pumping portion 5. As discussed above, the pump assembly 100 generally refers to any mechanical device that raises, transfers, delivers, or compresses fluids or that attenuates gases especially by suction or pressure or both. In one embodiment, the pump assembly 100 may be used for pumping glycol as preferred, but other substances may be pumped as well, such as oil and natural gas. FIG. 1 also shows the ported wear plates 600 and 601, which shows the apertures in the plates.

Figure 2:
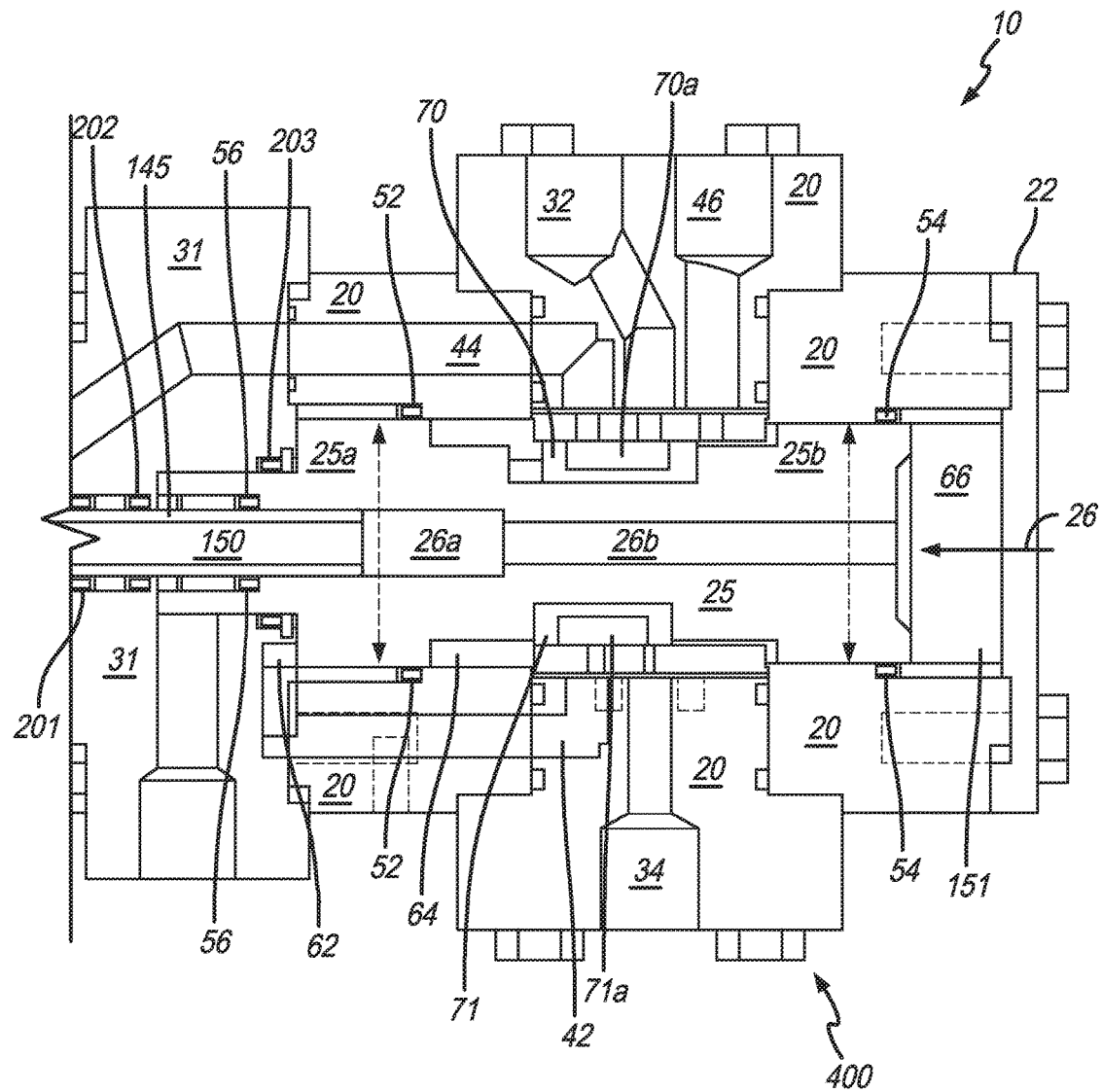
FIG. 2 is an illustration of a cross-section view of one embodiment of a motor portion of the pump assembly and shows the spool during the down stroke.

FIG. 2 is an illustration of a cross-section view of one embodiment of a motor portion of the pump assembly and shows the spool during the down stroke. As shown in FIG. 2, one embodiment of the motor portion 10 of the pump assembly 100 may comprise: a spool housing assembly 20; a spool 25; a first slide valve 70, a second slide valve 71; a valve stem 145; first seal 52, second seal 54, rod seal 56, and cover 22. One embodiment of the spool housing assembly 20 may comprise a lower housing portion, a middle housing portion, and an upper housing portion, all of which may form a spool chamber 151 together having a proximal chamber 62, supply chamber 64, and distal chamber 66. Specifically, the spool housing assembly 20 may also comprise a substantially hollow spool chamber 151, which may run essentially the entire length of the spool housing assembly 20. The spool housing assembly 20 may comprise a first exhaust port 32, a second exhaust port 34, first fluid conduit 42, second fluid conduit 44, and third fluid conduit 46.

The spool housing assembly 20 is preferably a structure that houses or contains the spool 25 within a spool chamber 151 (i.e., proximal chamber 62, supply chamber 64, and distal chamber 66). The spool 25 is a structure (preferably cylindrical) that is configured to move back and forth in a reciprocating manner, so as to control the flow of fluid, such as a liquid or a gas within the pump assembly 100. The first exhaust port 32, second exhaust port 34, first fluid conduit 42, second fluid conduit 44, and third fluid conduit 46 are preferably channels with openings that directs fluid, liquid, and/or gases within the motor portion 10 of the pump assembly 100 (i.e., spool 25 and spool housing assembly 20) to other areas of the pump assembly 100. Similarly, the first slide valve 70 and second slide valve 71 are preferably rectilinear valves used to control the emission of fluid, liquid, and/or gas from the motor portion 10 of the pump assembly 100. In one embodiment, the first slide valve 70 and the second slide valve 71 may be D-slide valves with a curved outer perimeter, each of which having an internal valve space 70a, 71b. In a preferred embodiment, the first slide valve 70 and the second slide valve 71 may be slide valves with a flat outer perimeter, each of which having an internal valve space 70a, 71b. Specifically, first slide valve 70 preferably has an internal valve space 70a, and the second slide valve 71 has an internal valve space 71a.

In one embodiment, the first internal valve space 70a of first slide valve 70 may provide a temporary and one-way passageway for the second fluid conduit 44 and third fluid conduit 46 to release fluid or gas through the first exhaust port 32. Similarly, the second internal valve space 71a of the second slide valve 71 may provide a temporary and one-way passageway for the first fluid conduit 44 to release fluid or gas through the second exhaust port 34.

In one embodiment, the first exhaust port 32, second fluid conduit 44, third fluid conduit 46, and the first slide valve 70 are located within a relatively short distance from one another within the motor portion 10 of the pump assembly 100. This preferably allows the outlets of the second fluid conduit 44, third fluid conduit 46, first exhaust port 32, and first internal valve space 70a of the first slide valve 70a to align in close proximity with each other as the spool 25 moves to a certain position within the spool housing assembly 20 during the reciprocating upstroke or down stroke motion of the spool 25. Similarly, in one embodiment, a second exhaust port 34, outlet of the first fluid conduit 42, and slide valve 71 are also located within a relatively short distance from one another within the motor portion 10 of the pump assembly 100. This also preferably allows the second exhaust port 34, outlet of the first fluid conduit 42, and the internal valve space 71a of the second slide valve 71 to align in close proximity with each other as the spool 25 moves to a certain position within the spool housing assembly 20 during the reciprocating upstroke or down stroke motion of the spool 25. This may also allow the fluid communicating through first fluid conduit 42 to access to the outside or exterior portion of the spool housing assembly 20 via the second exhaust port 34.

In one embodiment, the width of the spool chamber 151 may be the same or almost the same as the width of the spool 25. The length of the spool chamber 151 is also preferably longer than the length of the spool 25. Additionally, the spool 25 may be longer than the spool housing assembly 20 in overall length, but the spool chamber 150 formed by the spool housing 20 and top flange 31 may create a chamber that is longer than the spool 25. This may allow the spool 25 to traverse up and down (or back and forth, depending upon the orientation of the pump assembly 100) the length of the spool chamber 151 within the spool housing assembly 20. Thus, the spool 25 may move towards a distal end of the spool housing assembly 20 near the cover 22 and reciprocate back to its original position at a proximate end of the spool housing assembly 20. Thus, in its original position, the spool 25 may contract the distal chamber 66 when moving towards the distal end of the spool housing 20, and may expand the distal chamber 66 when reciprocating back to its original position (at the proximate end of the spool housing assembly 20). This may occur when the spool 25 moves between the two positions repeatedly and reciprocatingly via a piston 175 (shown in FIGS. 6A to 6C). Unfortunately, this action may cause fluid or air buildup within the proximal chamber 62, supply chamber 64, and/or distal chamber 66, thereby causing these pumps to stall or freeze during operation.

Importantly, FIG. 2 shows that the spool 25 may comprise a lower portion 25a and an upper portion 25b. In a preferred embodiment, the diameter of the lower portion 25a of the spool 25 is preferably larger than the diameter of the upper portion 25b of the spool 25. For example, in one embodiment, the diameter of the lower portion 25a of the spool 25 is between approximately 2% to 8% larger diametrically than the upper portion 25b of the spool 25. In a preferred embodiment, the diameter of the lower portion 25a of the spool 25 may be 4% larger diametrically than the upper portion 25b. This may create a larger surface area (e.g., approximately 7.3% larger surface area) that forces the spool 25 downwards when first applying pressurized control fluid to the spool housing assembly 20. For instance, when control fluid is supplied to the supply chamber 64, this fluid may fill the supply chamber 64 and push the spool 25 downwards due to the larger diameter of the lower portion 25a of the spool 25. The purpose of the larger lower portion 25a of the spool 25 is to ensure that the pump assembly 100 prevents or minimizes stalling during startup and to aid in the process of blowing down the spool 25 during normal cycling. Thus, the overall pressure balance acting on the spool 25 from the supply pressure preferably forces the spool 25 to the downward position.

In addition, FIG. 2 shows that the interior portion of the spool housing assembly 20 may form a distal chamber 66. In some embodiments, the distal chamber 66 may also be formed based on the location of the second seal 54. In a preferred embodiment, the distal chamber 66 may be located near or at the distal end of the spool housing assembly 20 and preferably just interior to the cover 22. In one embodiment, the center bore 26 of the spool 25 may be in fluid communication with the distal chamber 66, such that fluid or gas within the distal chamber 66 may flow through the center bore 26 of the spool 25 when the spool 25 is disposed within the spool chamber 151 of the spool housing assembly 20. Thus, fluid in the distal chamber 66 may also travel through the valve stem bore 150 of the valve stem 145.

Similarly, FIG. 2 also shows that the outer perimeter of the spool 25 and an interior portion of the spool housing assembly 20, in combination, may form a supply chamber 64. This supply chamber 64 may be formed based on the location of the first seal 52, second seal 54, and the spool 25. In a preferred embodiment, the supply chamber 64 may be located near or adjacent to the distal chamber 66 of the spool housing assembly 20. In one embodiment, depending upon the position of the spool 25 within the spool chamber 151, the first fluid conduit 42, the second fluid conduit 44 and third fluid conduit 46 may either be in communication with the supply chamber 64 or may be in communication with the internal valve spaces 70a, 71a of slide valves 70, 71. This may allow fluid or gas in the supply chamber 64 to selectively travel through the first fluid conduit 42, the second fluid conduit 44 and third fluid conduit 46 in order to enter and exit the supply chamber 64 within the spool housing assembly 20. In a preferred embodiment, first fluid conduit 42 is preferably in fluid communication with the second internal valve space 71a of the second slide valve 71 while the second slide valve 71 is at its first position (i.e., during the down stroke of the spool 25, as shown in FIG. 2). The first fluid conduit 42 also is preferably open to supply pressure in chamber 64, so as to put pressure at the bottom of the spool and help force it against the top cover. (i.e., during the upstroke of the spool 25 shown in FIG. 6H).

Furthermore, an outer perimeter of the spool 25 and an interior portion of the spool housing assembly 20, in combination, also may form a proximal chamber 62. Specifically, the proximal chamber 62 may be formed based on the location of the first seal 52 and may be located near or adjacent to the supply chamber 64 of the spool housing assembly 20. In a preferred embodiment, the first fluid conduit 42, is preferably in fluid communication with the proximal chamber 62, such that fluid or gas in the proximal chamber 62 may flow through the first fluid conduit 42.

FIG. 2 also shows that, in a preferred embodiment, the second fluid conduit 44, and the third fluid conduit 46 are generally in communication with first internal valve space 70a of first slide valves 70. Specifically, second fluid conduit 44 may be in fluid communication with the first internal valve space 71a of the first slide valve 70 when the first slide valve 70 is at its first position (i.e., during the down stroke of the spool 25, shown in FIG. 2), and the third fluid conduit 46 may be in fluid communication with the first internal valve space 70a of the first slide valve 70 when the first slide valve 70 is at its second position (i.e., during the upstroke of the spool 25, shown in FIG. 6H). Thus, depending upon whether the spool 25 is in the upstroke or down stroke position, second fluid conduit 44, or third fluid conduit 46 (but not both simultaneously) may be in fluid communication with the first internal valve space 70a. Similarly, depending upon whether the spool 25 is in the upstroke or down stroke position, second fluid conduit 44 may be in fluid communication with the internal valve space of the second slide valve 71.

FIG. 2 also shows that, during the down stroke of the spool 25, second fluid conduit 44 may be in fluid communication with the first exhaust port 32. At this moment, third fluid conduit 46 is preferably in fluid communication with the supply chamber 64, thereby allowing any fluid or gas within the supply chamber 64 to travel through the third fluid conduit 46 and towards the first cylindrical space 177a (shown in FIGS. 6A-6C) of the piston housing 200. Additionally, in this embodiment, during the down stroke, second fluid conduit 44 is preferably in fluid communication with the first internal valve space 70a (and thus also in fluid communication with the first exhaust port 32). The first fluid conduit 42 is also preferably in fluid communication with the second internal valve space 71a (and thus also in fluid communication with the second exhaust port 34).

FIG. 2 also shows that the spool 25 may comprise a center bore 26 that may extend essentially the entire length of the spool 25, and that a valve stem 145 or rod may be slidably engaged with the center bore 26. The valve stem 145 may also comprise a valve stem bore 150, which may traverse inwards from upper end of the valve stem 145, and generally has a suitable depth such that the end of the valve stem 145 may engage with the shoulder of center bore 26a of the spool 25. FIG. 2 shows that the valve stem bore 150 of the valve stem 145 is generally in fluid communication with the center bore 26 of the spool 25 and thus distal chamber 66. This preferably allows any fluid or gas located in the valve stem bore 150 of the valve stem 145 to travel or communicate towards and within the distal chamber 66, which may expand the distal chamber 66 and push or act against spool 25 to perform a down stroke.

FIG. 3 is an illustration of a perspective view of one embodiment of the spool. As shown in FIG. 3, one embodiment of the spool 25 may comprise a lower portion 25a, an upper portion 25b, a first support groove portion 27, a first spool bore 28, and a second spool bore 30. In various embodiments, the spool 25 may also comprise a second support groove portion 29 (shown in FIG. 5A). The spool 25 is preferably a cylindrical structure that is adapted to move back and forth in a reciprocating manner, so as to control the flow of fluid, such as a liquid or a gas within the motor portion 10 of the pump assembly 100.

The spool 25 may comprise a first support groove portion 27 and possibly a second support groove portion 29. Preferably, the first support groove portion 27 and second support groove portion 29 are machined and/or integrated into the side walls of the spool 25 and are both adapted to guide and cradle first slide valve 70 and second slide valve 71, respectively. The width of the first support groove portion 27 may be approximately the same as a width of the first slide valve 27. This may allow the first support groove portion 27 to prevent the first slide valve 70 from moving laterally. Similarly, the width of the second support groove portion 29 may be approximately the same as a width of the second slide valve 29, which may also allow the second support groove portion 29 to prevent the second slide valve 71 from moving laterally. On the other hand, the length of the first support groove portion 27 may be longer than a length of the first slide valve 70 in order to allow the first slide valve to move longitudinally.

The first slide valve 70 and second slide valve 71 used for the first support groove portion 27 and second support groove portion 29 may also have a flat surface (see FIGS. 4A and 4B). Unlike conventional slide valves, which generally include a curved outer surface, the flat outer surfaces of the first slide valve 70 and second slide valve 71 may allow the first slide valve 70 and second slide valve 71 to wander off center and not properly cover the ports. This allows control fluid supplied in the supply chamber 64 to travel into ports that are not completely covered by the first slide valve 70 or second slide valve 71. This helps the control fluids to enter the fluid conduits, thereby providing continuous movement of the piston 175 and spool 25 and preventing or minimizing stalling.

Additionally, FIG. 3 shows that the spool 25 may comprise a first spool bore 28 and second spool bore 30. The first spool bore 28 preferably extends or traverses laterally through the first support groove portion 27. This allows the first slide valve 70 to be in fluid communication with the first spool bore 28 when the first support groove 27 supports or cradles the first slide valve 70. Similarly, the second spool bore 30 preferably extends or traverses laterally through the second support groove portion 29. This also allows the second slide valve 71 to be in fluid communication with the second spool bore 30 when the second support groove 29 supports or cradles the second slide valve 71. These bores and grooves may be added to the spool 25 to allow quick fluid access to the flat, underside surfaces of the first slide valve 70 and second slide valve 71. This also allows for the first slide valve 70 and second slide valve 71 to activate or react quickly against the spool housing assembly 20 and therefore seal fluid from leaking to lower pressure areas.

FIG. 3 shows slot 2020, which may accept the engagement of a pin that prevents the entire spool from rotating in an unwanted manner.

FIGS. 4A and 4B are illustrations of perspective views of one embodiment of the slide valves. As shown in FIGS. 4A and 4B, embodiments of the slide valve 70, 71 may comprise an internal valve space 70a, 71a and a groove 70b, 71b. As discussed above, the first slide valve 70 and second slide valve 71 are preferably rectilinear valves used to control the emission of fluid, liquid, and/or gas from the pump assembly 100. Specifically, the first slide valve 70 preferably has an internal valve space 70a, and second slide valve 71 may have an internal valve space 71a. The internal valve spaces 70a, 71a of the slide valves 70, 71 may help direct or guide the emission of fluid, liquid, or gas to the appropriate fluid conduit or exhaust port. Additionally, the grooves 70b, 71b help fluid to access to the flat, underside surfaces of the first slide valve 70 and second slide valve 71, as the grooves 70b, 71b help allow for the first slide valve 70 and second slide valve 71 to react quickly against the spool housing assembly 20.

FIGS. 4A and 4B also show that the first slide valve 70 and the second slide valve 71 may be slide valves with a flat outer perimeter (rather than a curved outer perimeter due to the curvature of the spool housing assembly). This allows the first slide valve 70 and the second slide valve 71 to move or wander off center and not properly cover the ports of the fluid conduits. As a result, control fluid supplied in the supply chamber 64 may travel into ports that are not completely covered by the first slide valve 70 and/or second slide valve 71.

Figure 5A:
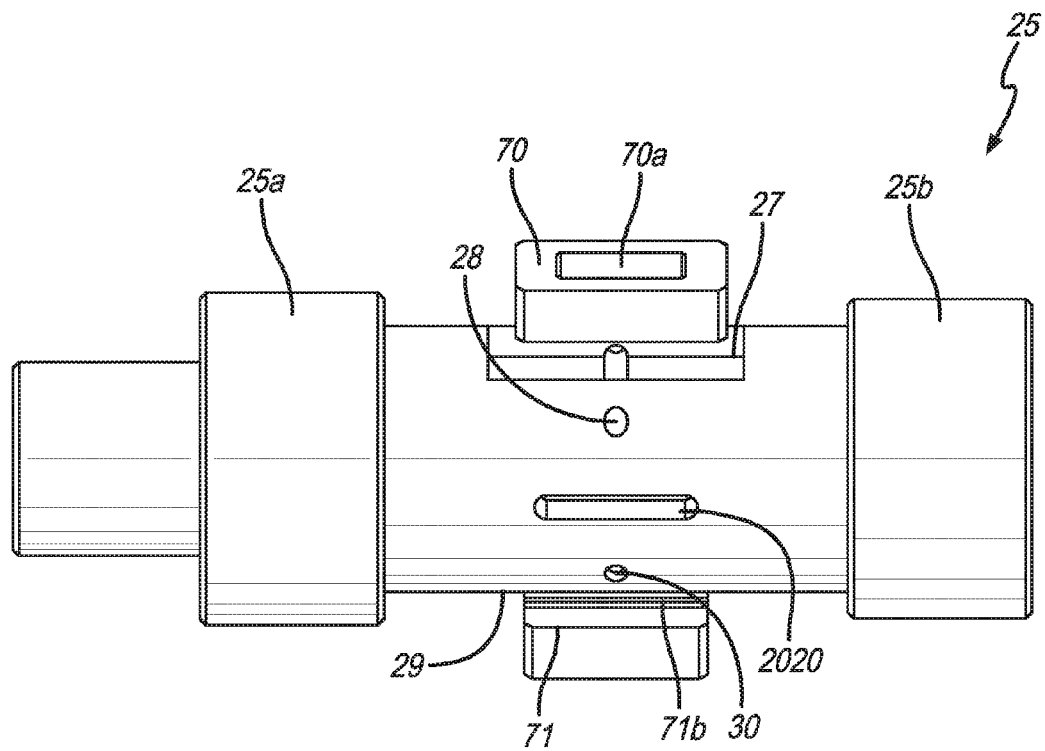
FIGS. 5A and 5B are illustrations of perspective views of one embodiment of the spool with the slide valves.
Figure 5B:
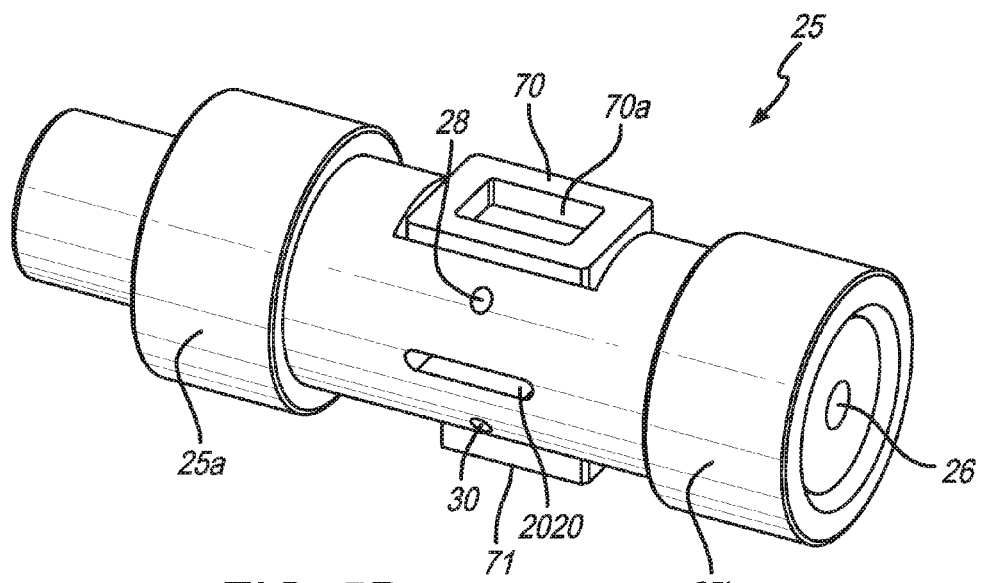

FIGS. 5A and 5B are illustrations of perspective views of one embodiment of the spool with the slide valves. As shown in FIGS. 5A and 5B, one embodiment of the spool 25 may comprise a lower portion 25a, an upper portion 25b, a first support groove portion 27, a first spool bore 28, and a second spool bore 30. FIGS. 5A and 5B also show that each slide valve 70, 71 may comprise an internal valve space 70a, 71a and a groove 70b, 71b.

FIGS. 5A and 5B show that the first support groove portion 27 may help support or cradle the first slide valve 70, and that the second support groove portion 29 may help support or cradle the second slide valve 71. This allows the support groove portions 27, 29 to hold or support the slide valves 70, 71 when in use. The spool bores 28, 30 may be used to allow quick fluid access to the flat, underside surfaces of the first slide valve 70 and second slide valve 71.

FIGS. 5A and 5B shows slot 2020, which may accept the engagement of a pin that prevents the entire spool from rotating in an unwanted manner.

Figure 6A:
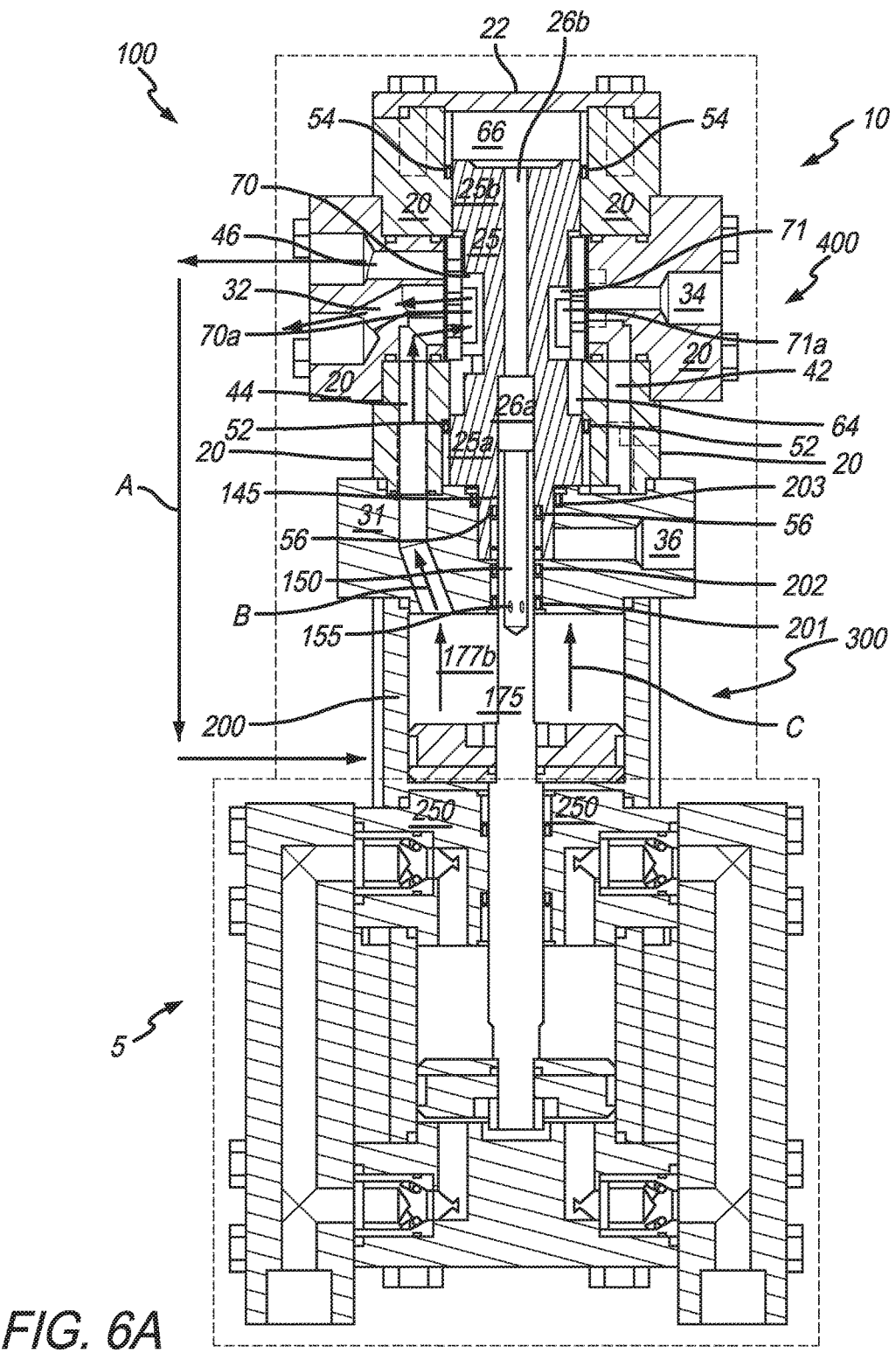
FIGS. 6A to 6Q are illustrations of cross-section views of one embodiment of the pump assembly and shows the pump assembly in operation.
Figure 6B:
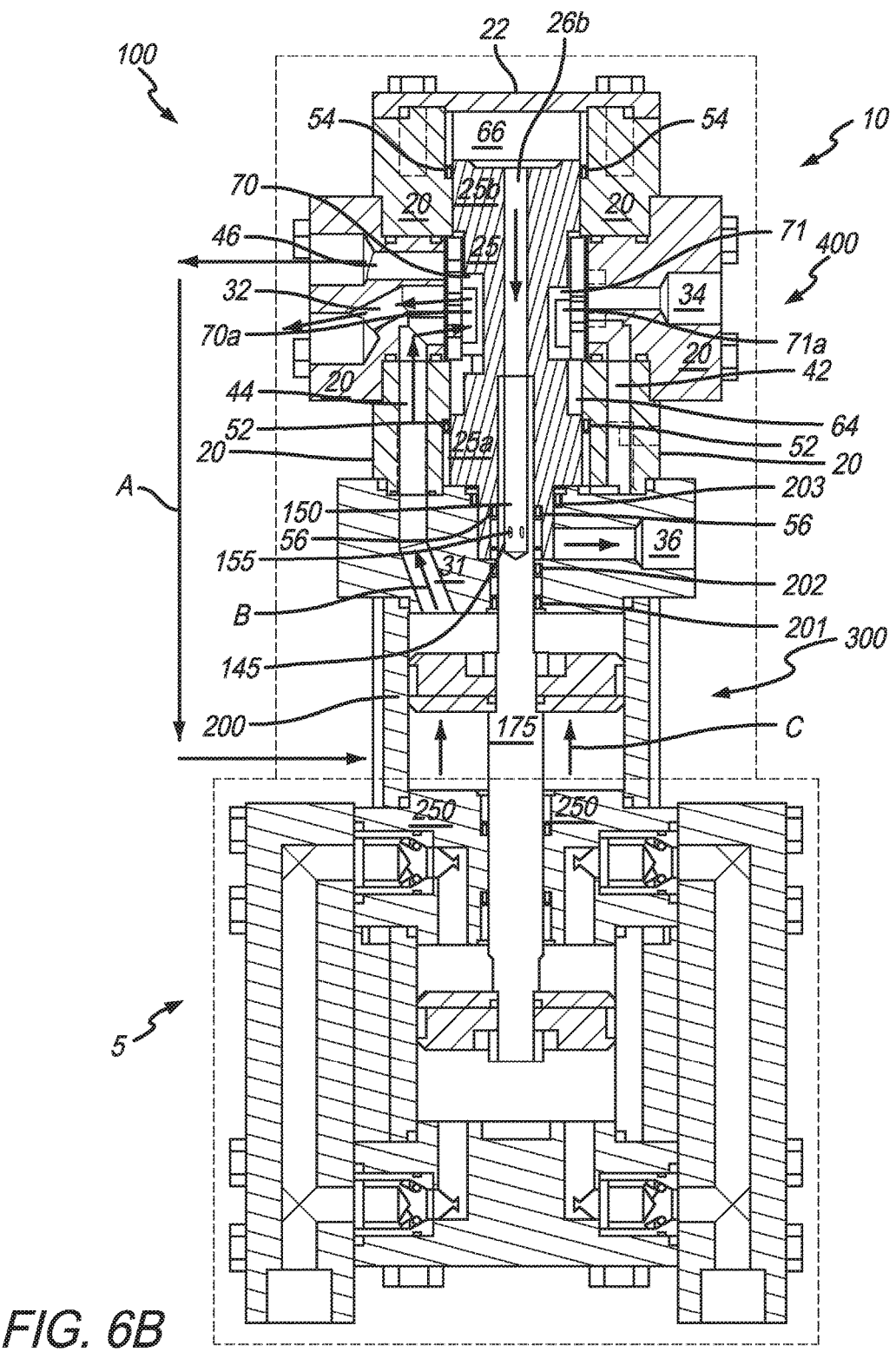
Figure 6C:
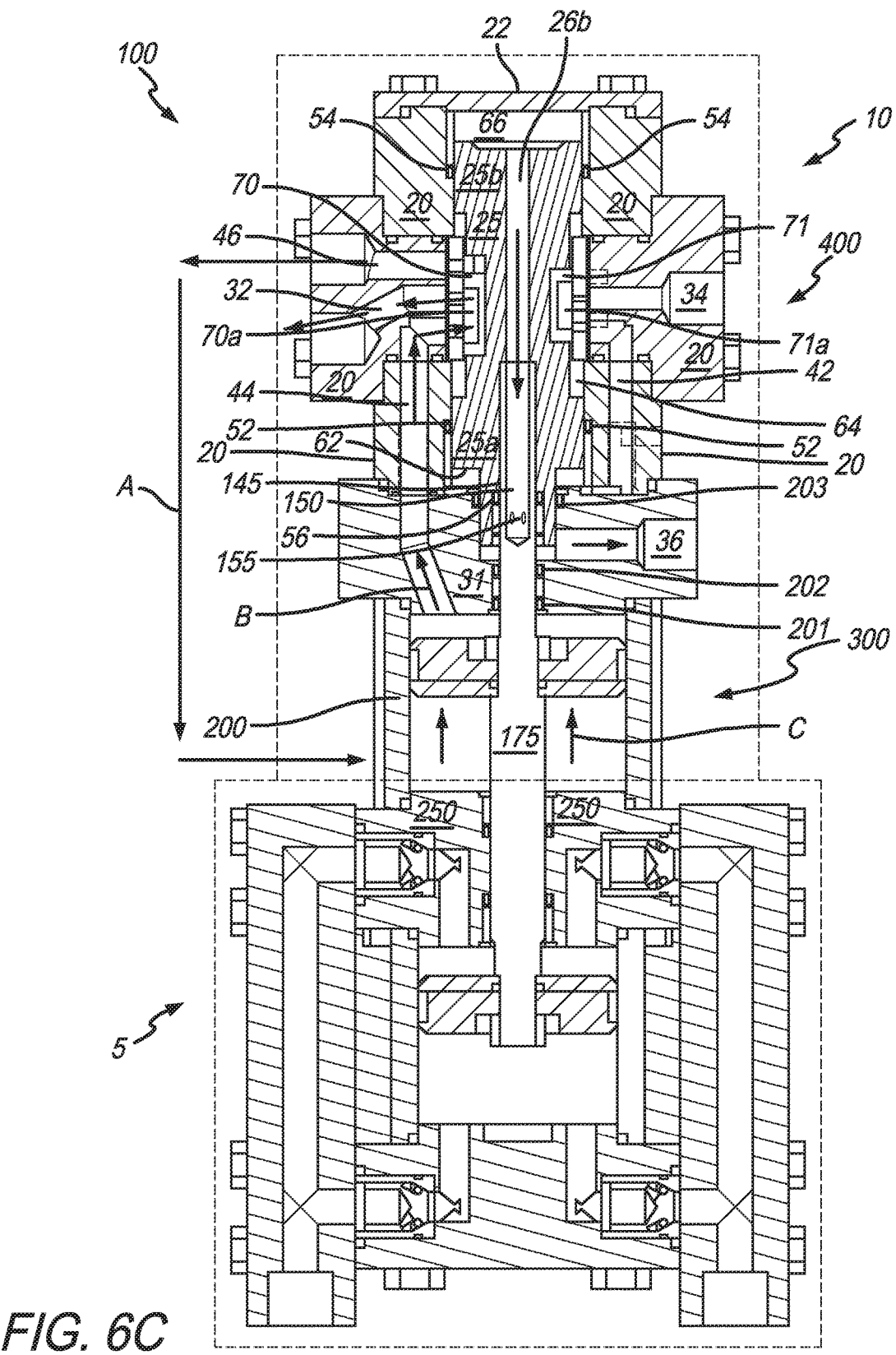
Figure 6D:
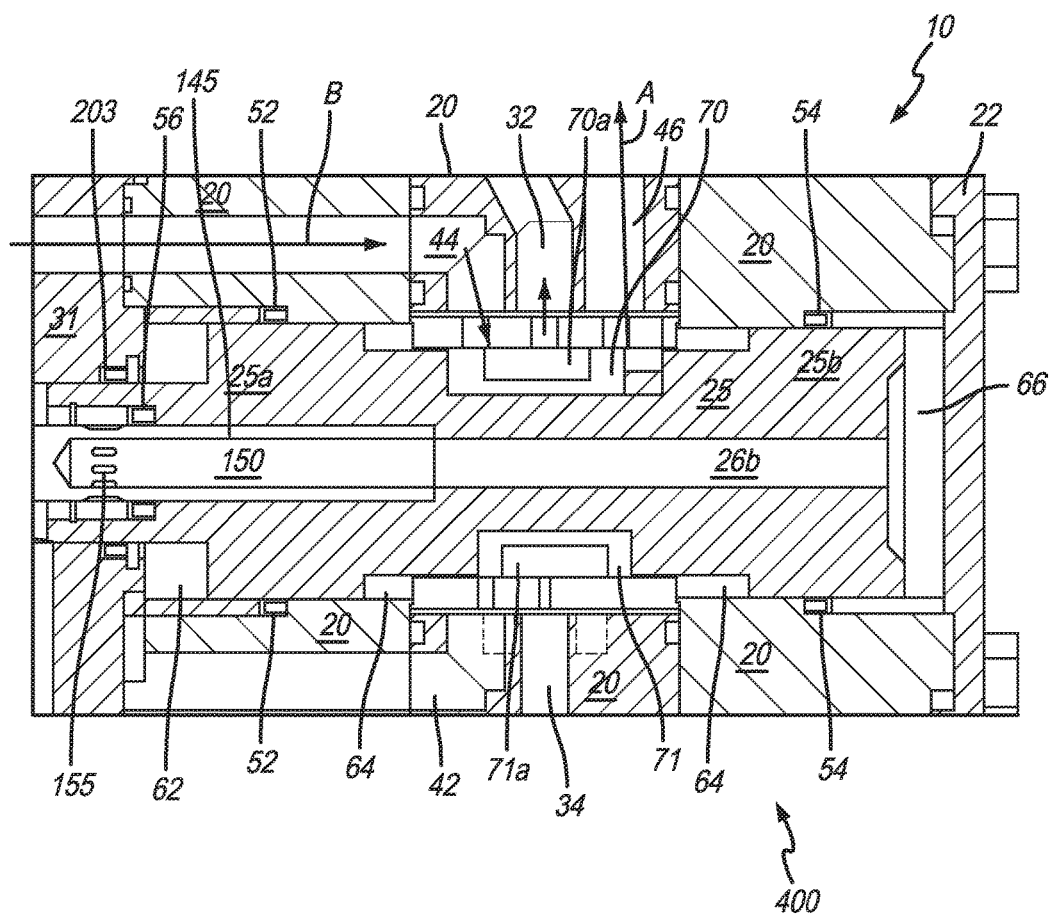
Figure 6E:
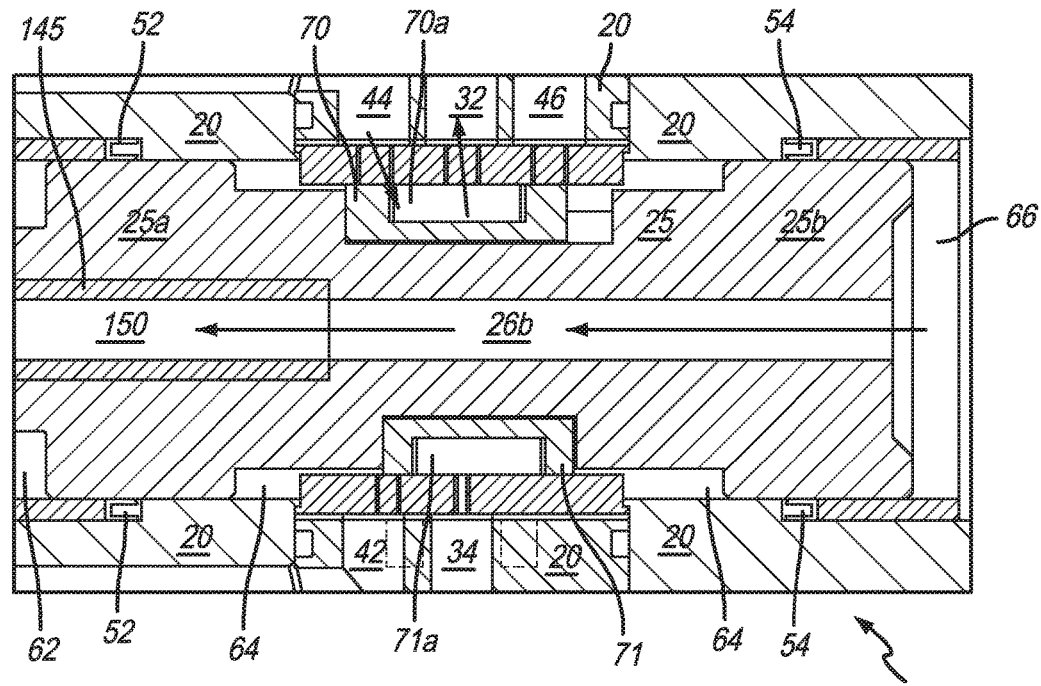
Figure 6F:
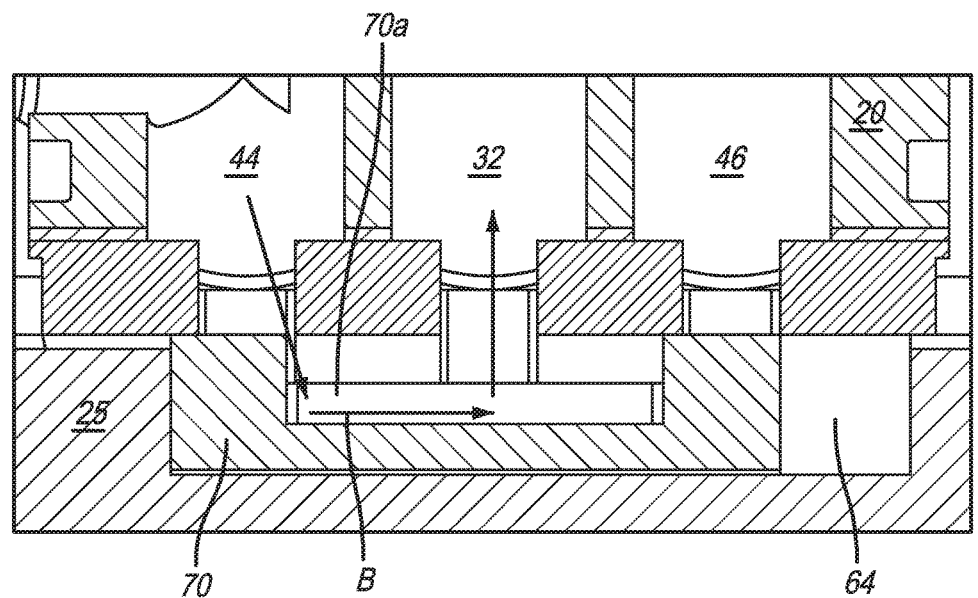
Figure 6G:
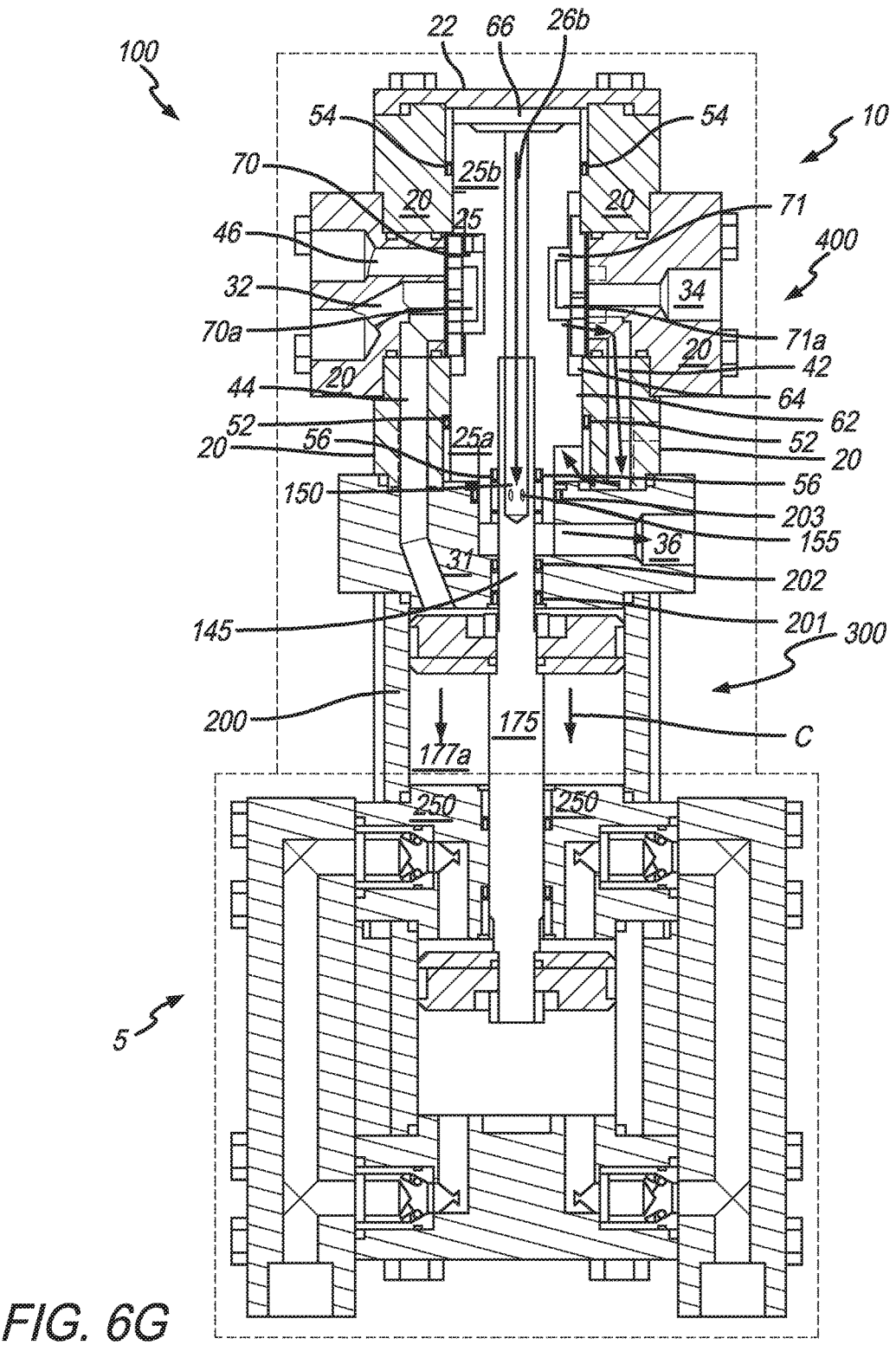
Figure 6H:
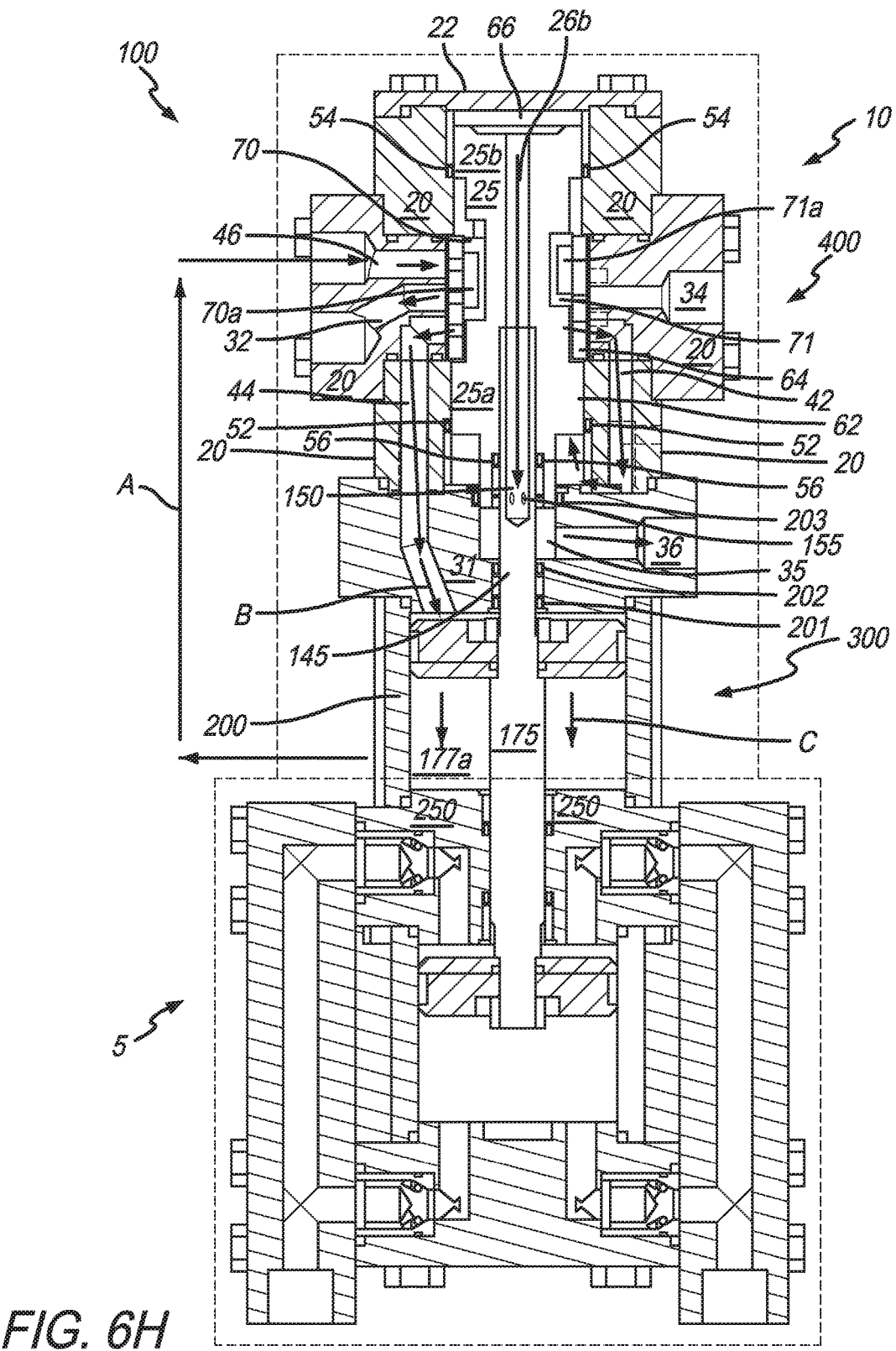
Figure 6I:
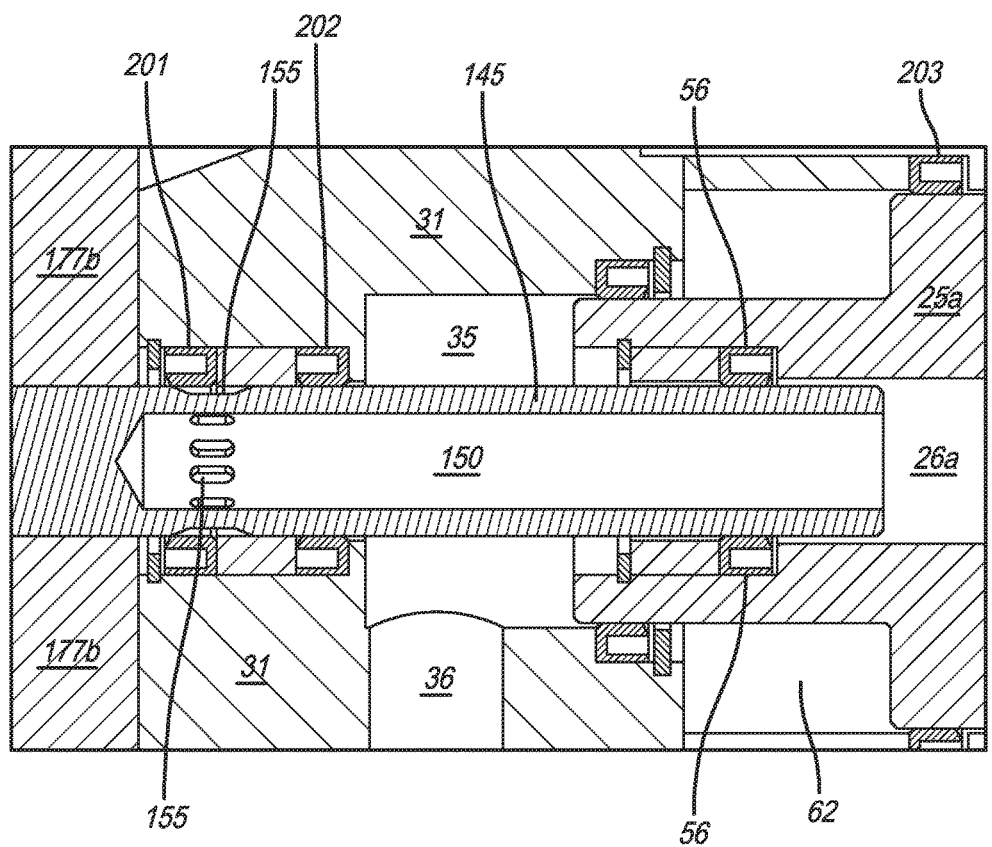
Figure 6J:
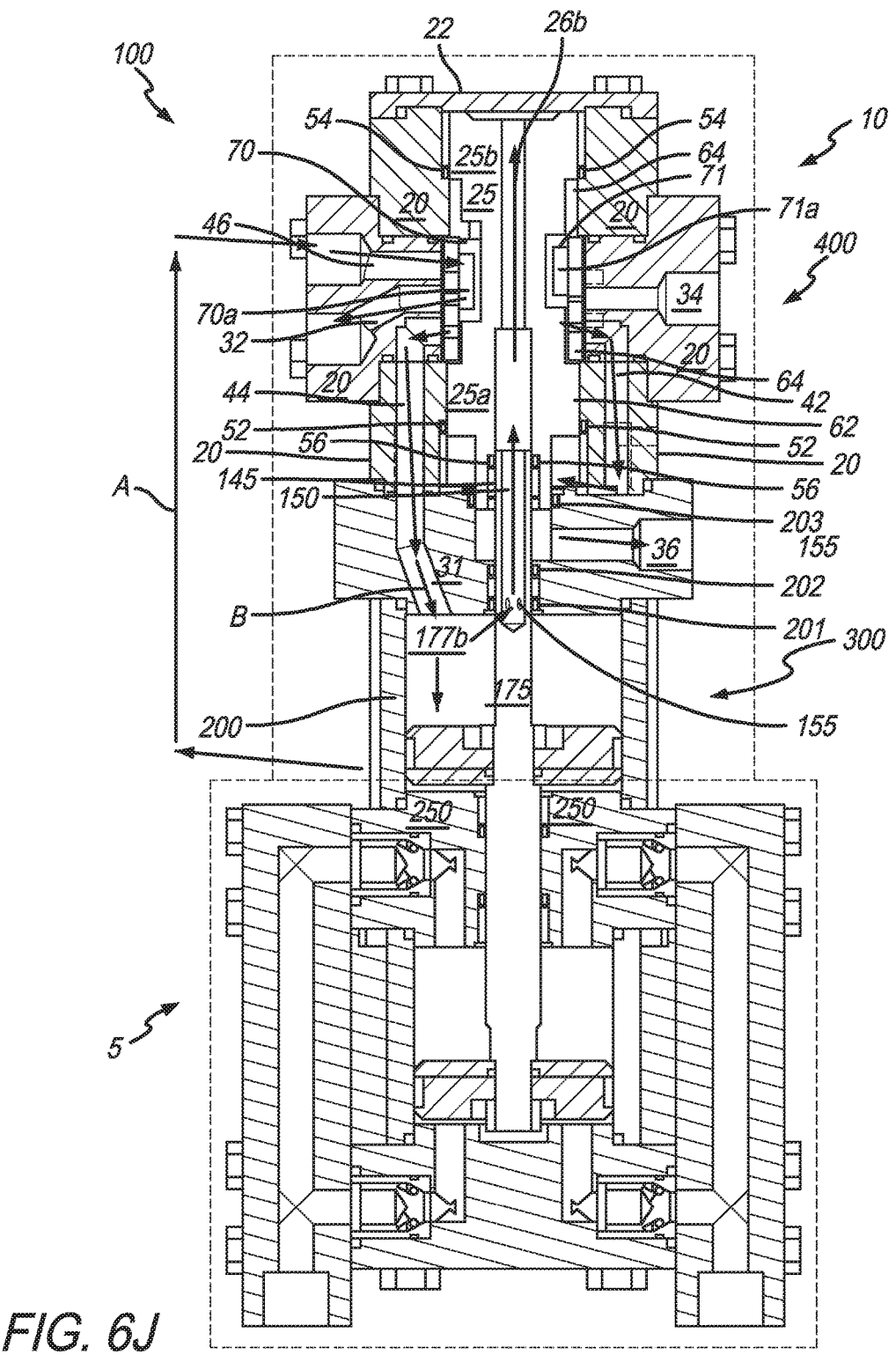
Figure 6K:
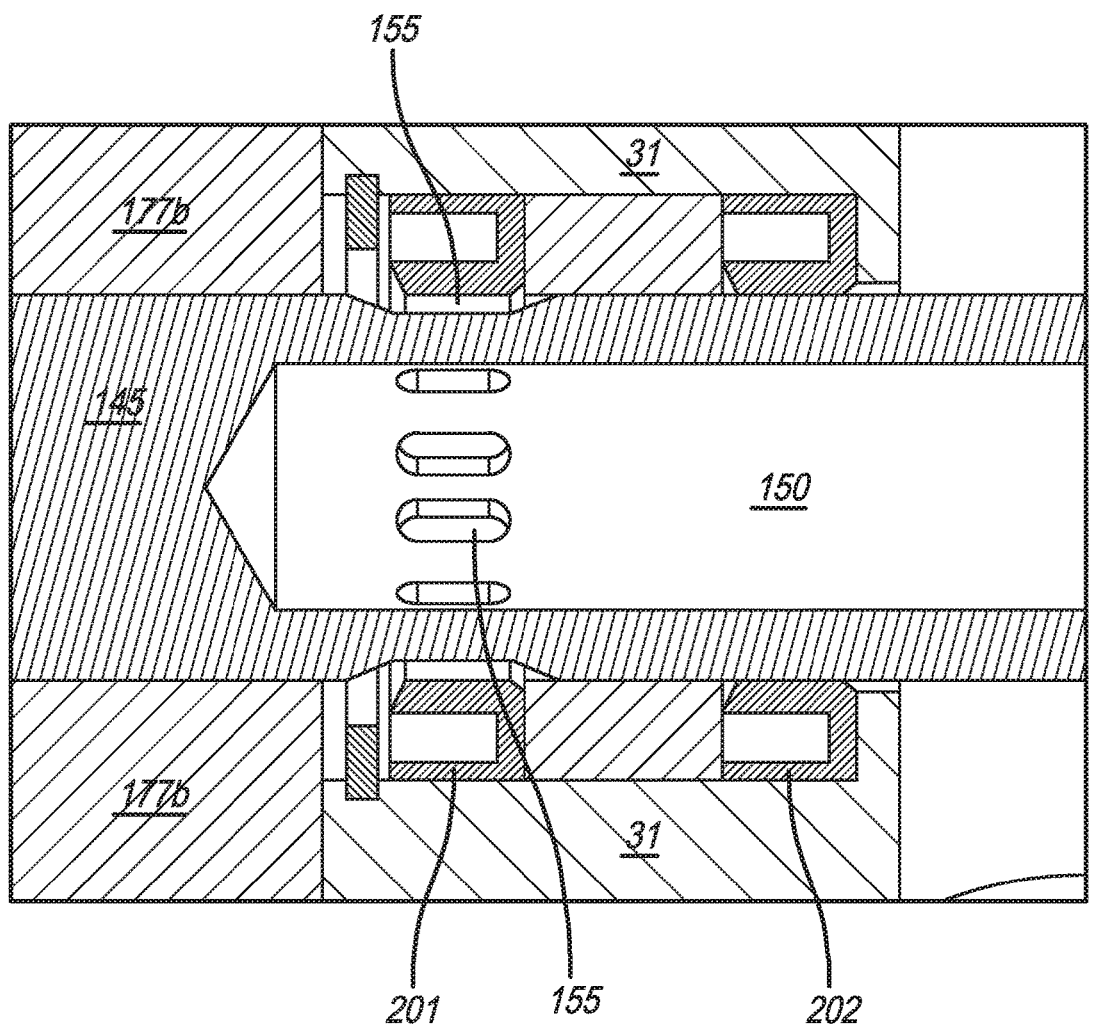
Figure 6L:
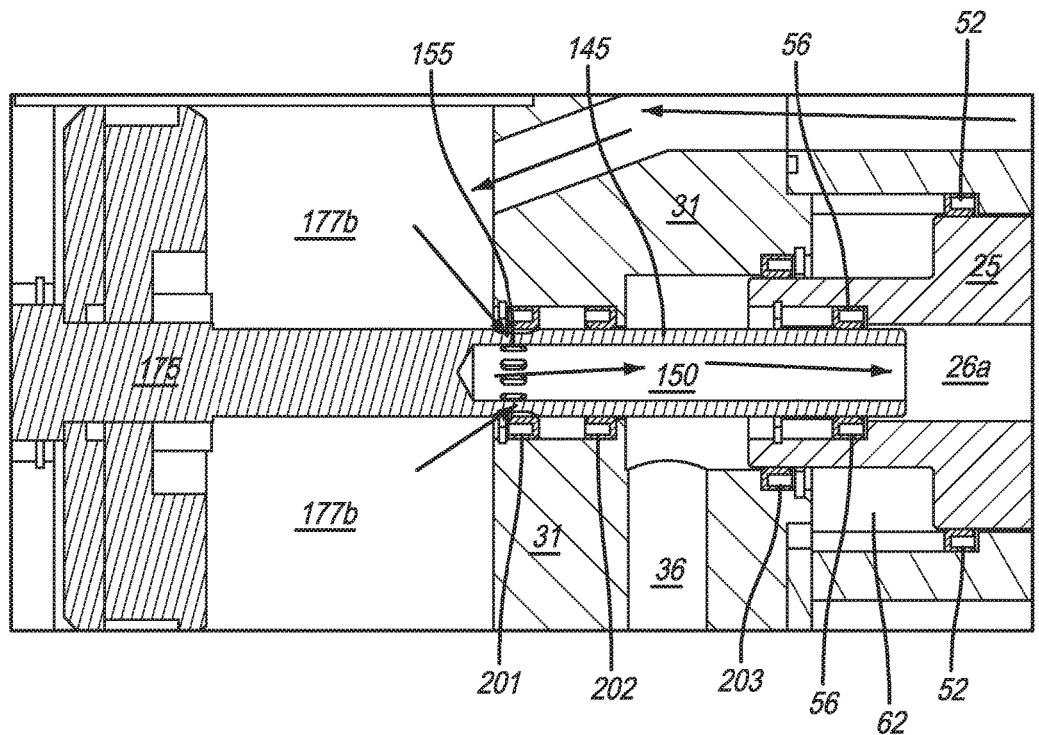
Figure 6M:
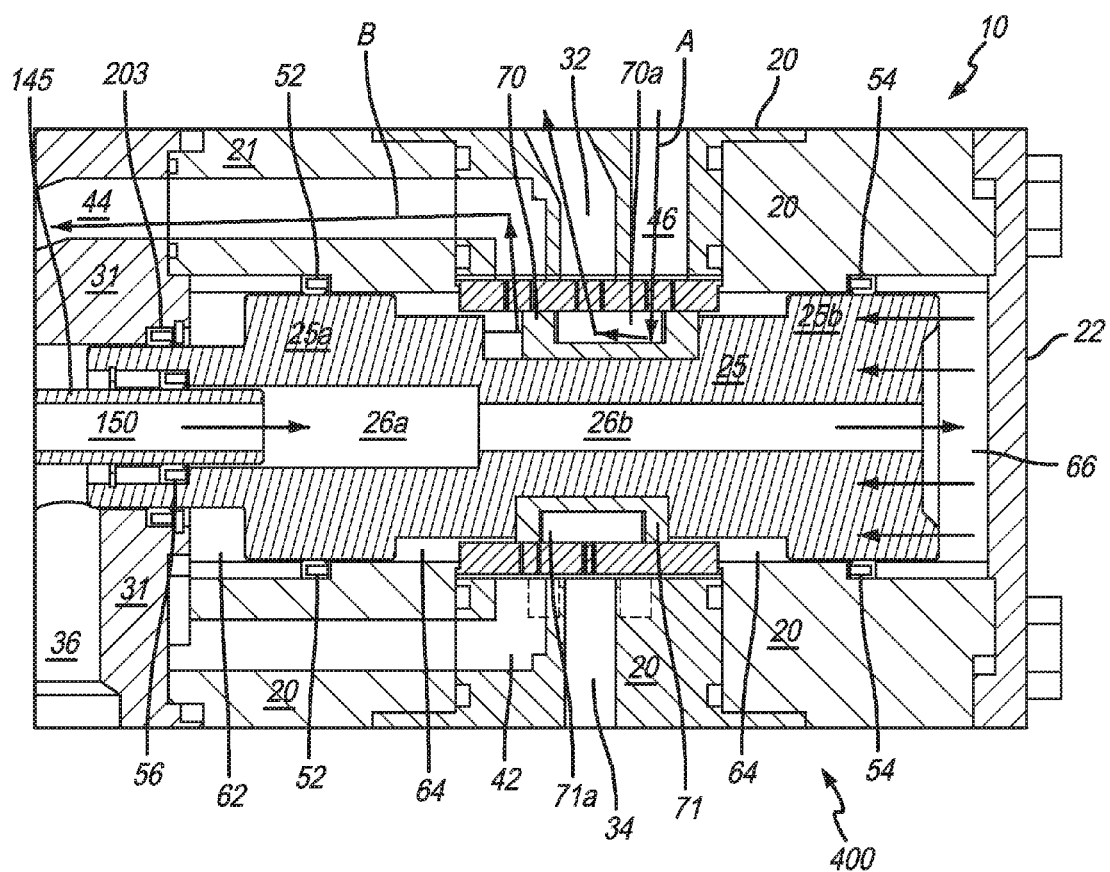
Figure 6N:
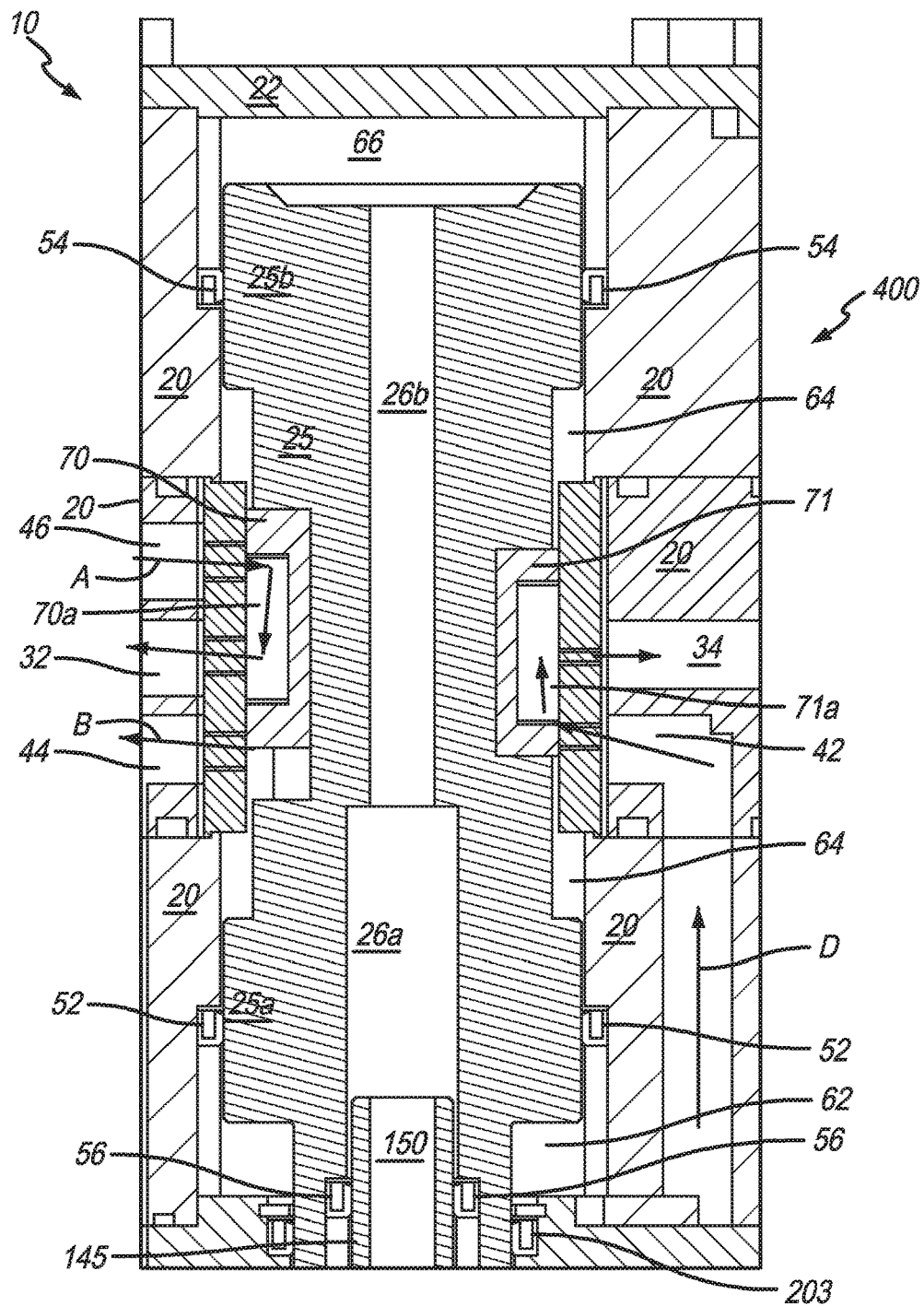
Figure 6O:
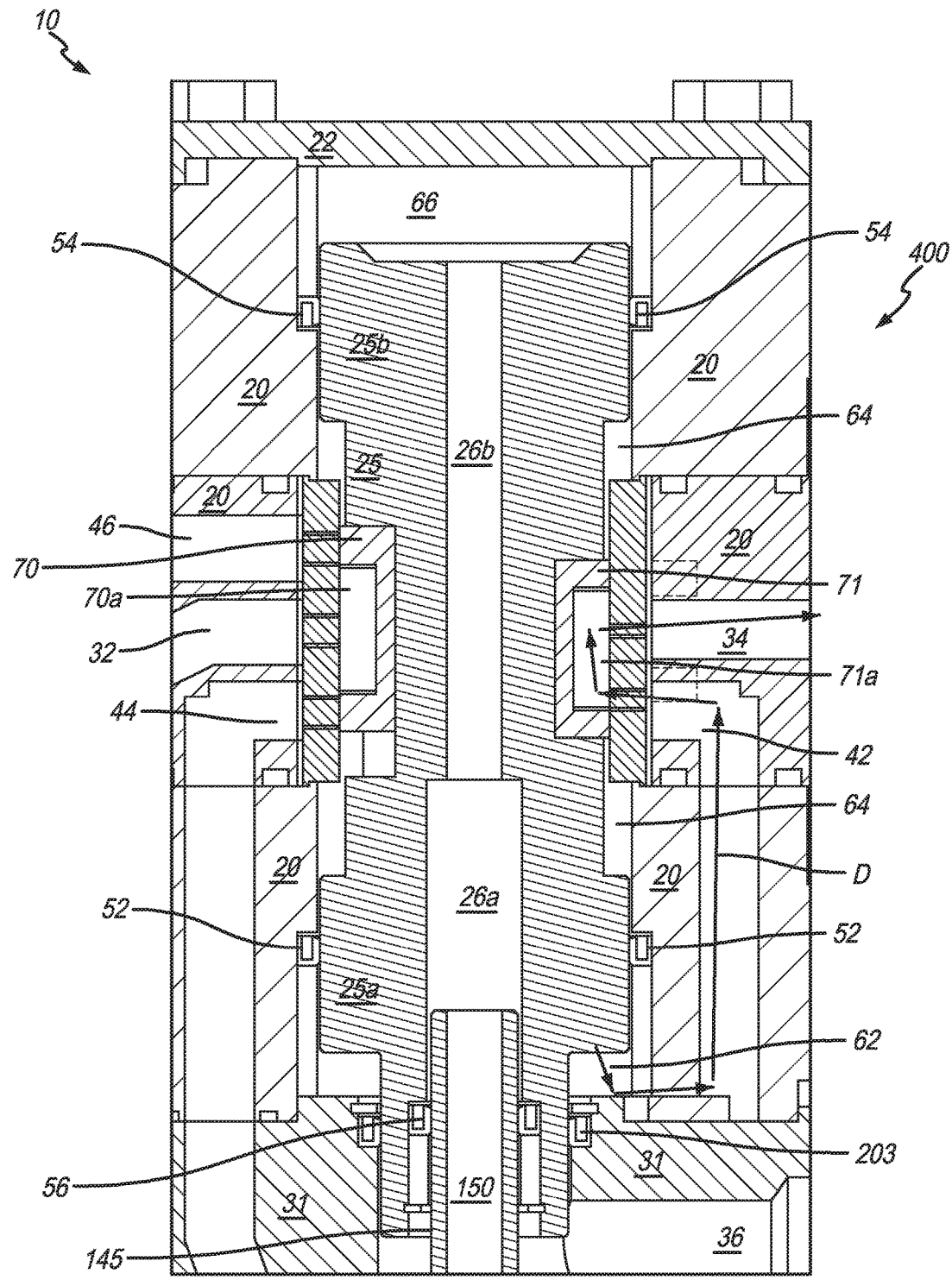
Figure 6P:
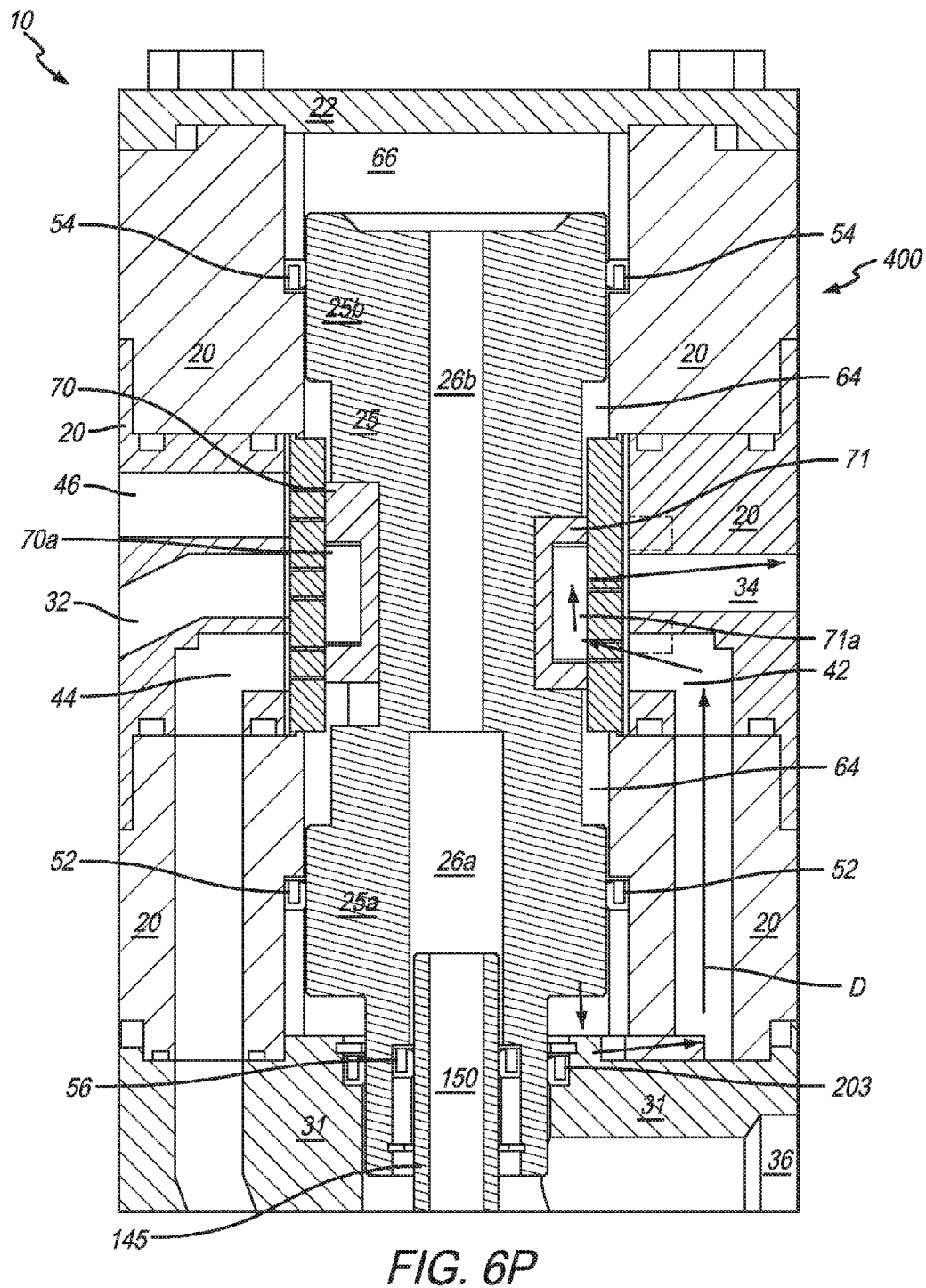
Figure 6Q:
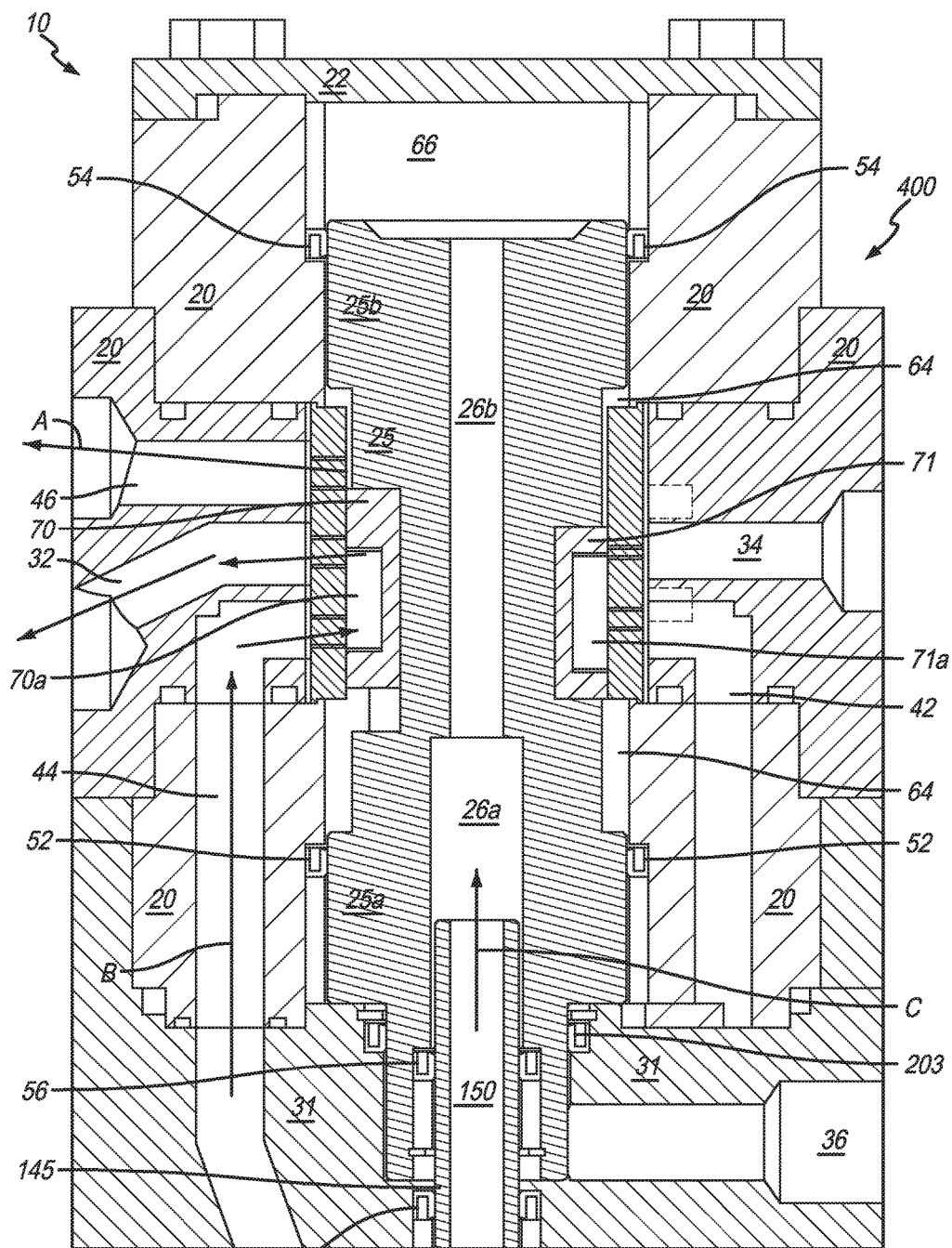

FIGS. 6A to 6Q are illustrations of cross-section views of one embodiment of the pump assembly and shows the pump assembly in operation. As shown in FIGS. 6A to 6Q, one embodiment of the pump assembly 100 may comprise: a fluid pumping portion 5 and a motor portion 10. FIGS. 6A to 6Q also shows that the motor portion 10 may comprise: a spool housing assembly 20; spool 25; slide valves 70, 71; valve stem 145; first seal 52, second seal 54, rod seal 56; cover 22; top flange 31, and top flange seals 201, 202, 203.

First, FIGS. 6A to 6Q show that the spool 25 may be coupled to a piston 300 for driving the fluid pumping portion 5. The piston 300 may be formed by a cylindrical side wall 200, piston 175, and valve stem 145. Specifically, in one embodiment, the piston housing 200 may comprise a top flange 31, bottom flange 250 (formed as part of the fluid pumping portion), and a cylindrical side wall 200. FIGS. 6A to 6C, 6H, 6J also show that the top flange 31, bottom flange 250, and the cylindrical side wall 200 may form a piston chamber where the piston 175 is reciprocally movable within the piston chamber and divides the piston chamber into two cylindrical spaces 177a, 177b. Specifically, piston 175 may divide the piston chamber to a first cylindrical space 177a and a second cylindrical space 177b. In this manner, when piston 175 moves downwards towards the bottom flange 250 or performs a down stroke, first cylindrical space 177a preferably narrows while second cylindrical space 177b expands. Conversely, when piston 175 moves upwards towards the top flange 31 or performs an upstroke, first cylindrical space 177a preferably expands while second cylindrical space 177b narrows.

FIGS. 6A to 6G also show that the proximal portion of the valve stem 145 is preferably coupled, attached, or integrated with the piston 175, while the distal portion of the valve stem 145 is preferably slideably engaged within the proximal portion of the center bore 26a of the spool 25. Because the top flange 31 preferably comprises a valve stem opening 180 with top flange seals 201, 202, 203 disposed within the valve stem opening 180, these top flange seals 201, 202, 203 are also preferably slideably engaged with the valve stem 145.

Additionally, FIGS. 6A to 6Q show that valve stem 145 preferably comprises a valve stem bore 150 and valve stem openings 155, wherein the valve stem bore 150 and the valve stem openings 155 are preferably in communication with the center bore 26 of the spool 25. This allows fluid or gas to communicate from the valve stem bore 150 and valve stem openings 155 to the distal chamber 66 of the spool valve 400. Conversely, when valve stem openings 155 are exposed within second cylindrical space 177b after the piston 175 moves towards the bottom flange 250 and shifts and exposes valve stem openings 155 of the valve stem 145 within the second cylindrical space 177b, valve stem bore 150 of valve stem 145 communicates with the second cylindrical space 177b.

FIGS. 6A to 6Q also shows that, in one embodiment, the third fluid conduit 46 is preferably in communication with the piston housing 200 in order to allow fluid or gas to communicate with the first cylindrical space 177a of the piston assembly 300. Similarly, FIGS. 6A to 6Q also shows that the second fluid conduit 44 is preferably in communication with the top flange 31 to allow fluid or gas to communicate with the second cylindrical space 177b of the piston 300.

Importantly, FIGS. 6A to 6Q also shows the pump assembly 100 in operation. Specifically, FIG. 6A shows the pump assembly 100 at the beginning of its upstroke. As spool valve 400 is in the position of FIG. 6A at the end of its down stroke (i.e., while the proximal end of the spool 25 is near or adjacent to the top flange 31 and the slide valves 70, 71 are in their first position, pressurized control fluid communicates or travels in the direction of ARROW A from the supply chamber 64 to the first cylindrical space 177a via the third fluid conduit 46 in order to apply pressure against the bottom surface of piston 175. This will cause the piston 175 and valve stem 145 to move upwards in the direction of ARROW C. During this time, the second cylindrical space 177b is preferably vented to ambient pressure in the direction of ARROW B as the second cylindrical space 177b is in communication with the second fluid conduit 44, first exhaust port 32, and the internal valve space 70a of first slide valve 70 in its first position. Fluid or gas stored in the proximal chamber 62 is also preferably in communication with the first fluid conduit 42, second exhaust port 34, and the internal valve space 71a of the second slide valve 71 in its first position to vent the fluid or gas to ambient pressure. The distal chamber 66, center bore 26 of the spool valve 25, valve stem bore 150, and valve stem openings 155 of valve stem 145 are preferably in communication with the second cylindrical space 177b. Preferably, the venting to ambient pressure is vented to a closed loop low pressure regeneration system that removes the water from the glycol so that the glycol can be recycled.

FIG. 6B shows the valve stem 145 is against the shoulder of center bore 26a while the piston 175 and valve stem 145 continue their upwards longitudinal movement. As discussed above, second cylindrical space 177b is preferably still in communication with first exhaust port 32 via second fluid conduit 44 and first internal valve space 70a of the first slide valve 70 in its second position. Thus, as piston 175 continues to move upwards in the direction of the ARROW C, fluid in second cylindrical space 177b continues to vent through the first exhaust port 32 towards ambient pressure in the direction of ARROW B. Pressurized control fluid, on the other hand, continues to communicate in the direction of ARROW A from supply chamber 64 through third fluid port 46 to apply pressure and act against the bottom surface of piston 175. During this time, any fluid in the proximal chamber 62 is vented through the second exhaust port 34 from first fluid conduit 42, second internal valve space 71a of slide valve 71. Preferably, spool 25 is still positioned near or adjacent to the top flange 31. However, the continued upward motion of piston 175 will also move valve stem 145 towards the shoulder of the center bore 26a. Additionally exposing the valve stem openings 155 of valve stem 145 within the top flange chamber 35 preferably allows fluid to communicate through flange exhaust port 36. This also allows fluid in distal chamber 66 to exhaust through center bore 26 and through flange exhaust port 36. Once the valve stem 145 reaches the shoulder of the center bore 26a, spool 25 continues to perform its upward movement due to fluid in the distal chamber 66 venting through flange exhaust port 36.

FIG. 6C shows the beginning of the shifting of first slide valve 70 from its first position during the upward movement of spool 25. Here, valve stem bore 150, valve stem openings 155, and distal chamber 66 are in communication with flange exhaust port 36. This allows fluid in the distal chamber 66 to exhaust through flange exhaust port 36. Additionally, fluid located at the second cylindrical space 177b may vent through first exhaust port 32 via second fluid conduit 44 in the direction of ARROW B. Control fluid provided by the supply chamber 64 of spool valve 400 preferably still continues to communicate through the third fluid conduit 46 and into first cylindrical space 177a in the direction of ARROW A to provide control or supply fluid acting against the bottom surface of piston 175. This preferably continues to drive piston 175 and its valve stem 145 in the direction of ARROW C. At this time, piston 175 is preferably moving valve stem 145 against the shoulder of the center bore 26a of spool 25, thereby moving the spool 25 upwards longitudinally.

FIG. 6D shows in detail the continuous upward movement of spool 25 after the spool 25 movement shown in FIG. 6C. During this time, although the first slide valve 70 almost completely blocks the port of the second fluid conduit 44, fluid in the second cylindrical space 177b may continue to vent towards ambient pressure through the second fluid conduit 44, first internal valve space 71a, and first exhaust port 32 towards ambient pressure in direction ARROW B. Additionally, fluid stored in the distal chamber 66 may communicate through center bore 26 of spool valve 25 and valve stem bore 250, and valve stem openings 155, thereby causing the fluid in the distal chamber 66 to vent through top flange exhaust port 36. Importantly, control fluid from the supply chamber 64 is still allowed to travel into the first cylindrical space 177a via the third fluid conduit 46. Here, the second slide valve 71 begins to create an opening for the second fluid conduit 42. As a result, control fluid supplied by the supply chamber 64 may begin entering the first fluid conduit 42 and travel into the proximal chamber 62, thereby creating control pressure against the bottom portion of the spool 25 in the proximal chamber 62. As a result, the spool 25 may continue to perform its upstroke stroke towards the cover 22, which preferably causes the first slide valve 70 and second slide valve 71 to shift from their first position and to their second position. This shifting of the first slide valve 70 and second slide valve 71 from their first position towards their second position preferably causes: (1) first slide valve 70 to begin blocking the third fluid conduit 46 (see FIG. 6E) and (2) continue to allow the supply chamber 64 to be in communication with the first fluid conduit 42 (see FIG. 6E).

FIG. 6E shows in detail the continuous upward movement of spool 25 after the spool 25 movement shown in FIG. 6D. As shown in FIG. 6E, the first slide valve 70 preferably completely blocks the third fluid conduit 46. During this time, venting of the fluid in the second cylindrical space 177b towards ambient pressure through the second fluid conduit 44, first internal valve space 71a, and first exhaust port 32 begins to end, as entrance to the port of the second fluid conduit 44 is about to be completely blocked by the first slide valve 70a. This preferably causes the piston 175 to temporarily stop moving the valve stem 145 upwards against the center bore 26a of the spool 25. However, pressurized control fluid from the supply chamber 64 may continue to travel into the first fluid conduit 42 and into the proximal chamber 62, thereby increasing the control pressure against the bottom portion 25a of the spool 25 and causing the spool 25 to perform an upstroke towards the cover 22. Additionally, fluid stored in the distal chamber 66 may continue to communicate through center bore 26a, 26b of spool valve 25 and valve stem bore 250, and valve stem openings 155 to reach ambient pressure through the top flange exhaust port 36. This continuous shifting of the first slide valve 70 and second slide valve 71 from their first position towards their second position will preferably cause: (1) the first exhaust port 32 to be in communication with the third fluid conduit 46 (see FIG. 6H) and (2) the supply chamber 64 to be in continuous communication with the first fluid conduit 42.

FIG. 6F shows in more detail the first slide valve 70 during its position shown in FIG. 6E. Specifically, FIG. 6F shows that the third fluid conduit 46 may be completely blocked by the first slide valve 70. FIG. 6F also shows that there might be a slight opening of the port of the second fluid conduit 44. This allows fluid in the second cylindrical space 177b to vent towards ambient pressure through the exhaust port 32 via the second fluid conduit 44 and first internal valve space 70a of the first slide valve 70, as shown in the direction of ARROW B. This venting, however, begins to end, as entrance to the second fluid conduit 44 is about to be completely blocked by the first slide valve 70. This preferably causes the piston 175 to stop moving the valve stem 145 upwards against the shoulder of the center bore 26a of spool 25. The continuous shifting of the first slide valve 70 will preferably cause the first slide valve 70 to move from their first position towards their second position, causing the first exhaust port 32 to be in communication with the third fluid conduit 46 (see FIG. 6H).

FIG. 6G shows the first slide valve 70 completely blocking the second fluid conduit 44 and third fluid conduit 46 during the upstroke of the spool 25. During this time, the first exhaust port 32 is completely blocked, and the piston 175 and valve stem 145 are preferably not moving upwards. Although a portion of the second slide valve 71 may be blocking the second fluid conduit 42, pressurized fluid in the supply chamber 64 continues to flow through the first fluid conduit 42 and into the proximal chamber 62. This generally creates pressure against the bottom portion of the spool 25 to push the spool 25 upwards towards the cover 22. Fluid stored in the distal chamber 66 may vent through center bore 26 of spool valve 25, valve stem bore 250, and valve stem openings 155 to reach ambient pressure through flange exhaust port 36.

FIG. 6H shows the end of an upstroke of the spool valve 400 when the spool 25 reaches the cover 22. Here, as spool valve 400 reaches the end of its upstroke (i.e., while the distal end of the spool 25 is near or adjacent to the cover 22), the remaining fluid in the distal chamber 66 is preferably fully exhausted through the flange exhaust port 36 via center bore 26 of spool valve 25, valve stem bore 150, valve stem openings 155, and top flange chamber 35. Importantly, first slide valve 70 is its second position, causing pressurized control fluid to travel in the direction of ARROW B from the supply chamber 64 to the second cylindrical space 177b via the second fluid conduit 44. This causes pressure to be applied against the top surface of piston 175, causing the piston 175 and valve stem 145 to shift downwards in the direction of ARROW C. At this time, the first cylindrical space 177a is preferably vented to ambient pressure in the direction of ARROW A as the first cylindrical space 177a is in communication with the third fluid conduit 46, first exhaust port 32, and the internal valve space 70a of first slide valve 70 in its second position. The second exhaust port 34 is also preferably blocked by the second slide valve 71. Fluid stored in the supply chamber 64 is in communication with the proximal chamber 62 via the first fluid conduit 42, thereby causing the spool 25 to remain stationary while the piston 175 and valve stem 145 performs a down stroke away from the spool 25.

FIG. 6I shows in detail the valve stem 145 when the valve stem openings 155 begin reaching past the flange first seal 201. During this time, fluid in the center bore 26 of spool valve 25, valve stem bore 150, and valve stem openings 155 preferably travel just slightly beyond the flange seals 201, 202 because the flange seals 201 is preferably positioned proximal to the valve stem openings 155. This movement takes the pressure from the cylinder, travels to chamber 66 and blows the spool downward. This is the switching mechanism that switches the spool valve to the downward position. FIG. 6I shows that the valve stem openings 155 are funnel-shaped (or inwardly sloped) and are longer than the valve stem openings of conventional pump assemblies. This helps prevent shredding or cutting of the seals, in the event any of the seals are blown. Because the length of the valve stem openings 155 are longer than conventional valve stem openings, two seals 201, 202 are preferably used in order to isolate the second cylindrical space 177b and top flange chamber 35. This is done to help prevent "bridging" of the fluid communication between the top flange chamber 35 and second cylindrical space 177b. Additionally, the first slide valve 70 is preferably its second position, thereby causing pressurized control fluid to travel from the supply chamber 64 to the second cylindrical space 177b via the second fluid conduit 44. As a result, pressure is applied against the top surface of piston 175, causing the piston 175 and valve stem 145 to shift downwards. During this time, the first cylindrical space 177a is preferably venting to ambient pressure as the first cylindrical space 177a is in communication with the third fluid conduit 46, first exhaust port 32, and the internal valve space 70a of first slide valve 70 in its second position.

FIG. 6J shows the end of the downward movement of the piston 175 while the spool 25 remains near the cover 22. Here, the remaining fluid in the first cylindrical space 177a is almost fully exhausted through the first exhaust port 32 via third fluid conduit 46 and the first internal valve space 70a of first slide valve 70. Importantly, valve stem openings 155 are in fluid communication with the second cylindrical space 177b. This allows the valve stem bore 150, center bore 26 of spool valve 25, and distal chamber 66 to be in communication with the second cylindrical space 177b. During this time, pressurized control fluid is preferably traveling from the supply chamber 64 to the second cylindrical space 177b via the second fluid conduit 44. This causes the pressurized control fluid to travel towards the distal chamber 66 and blow the spool 25 downwards for a down stroke. The process may include some dwell time, as control fluid is also traveling from the first fluid conduit 42 towards the proximal chamber 62 against the bottom portion of the spool 25.

FIG. 6K shows in detail the valve stem 145 when the valve stem openings 155 begin reaching past the flange first seal 201. Here, fluid in the second cylindrical space 177b begins traveling through valve stem openings 155, valve stem bore 150, and center bore 26 of spool valve 25. This causes control fluid to build at the distal chamber 66 of the spool valve 400, thereby causing the spool 25 to shift downwards towards the top flange 31. Importantly, FIG. 6K shows that the valve stem openings 155 are funnel-shaped or ramped, such that a shape of valve stem openings 155 inwardly slope on valve stem 145 into the valve stem bore 150. This helps prevent the valve stem openings 155 from cutting or shredding the flange seals 201, 202 or rod seal 56 when/if the seals are blown.

FIG. 6L is another illustration that shows in detail the valve stem 145 when the valve stem openings 155 are shifting or moving past the flange seal 201 and are further within the second cylindrical space 177b. Here, fluid from the supply chamber 64 arriving in the second cylindrical space 177b continues to travel through valve stem openings 155, valve stem bore 150, and center bore 26 of the spool valve 25. This causes control fluid to build at the distal chamber 66 of the spool valve 400, thereby causing the spool 25 to shift downwards towards the top flange 31. FIG. 6L shows that the funnel-shaped or inwardly sloped valve stem openings 155 helps prevent cutting or shredding the flange seals 201, 202.

FIG. 6M shows the spool 25 being blown, pushed, or moved downwards towards the top flange 31. This movement is preferably due to, and/or assisted by, the transfer of control pressurized fluid traveling from the second cylindrical space 177b, valve stem openings 155, valve stem bore 150, and center bore 26 of the spool valve 25. Here, pressurized fluid from the supply chamber 64 travels to the second cylindrical space 177b via the second fluid conduit 44 in the direction of ARROW B. Fluid in the first cylindrical space 177a vents through first exhaust port 32 in the direction of ARROW A via the third fluid conduit 46 and first internal valve space 70a of the first slide valve 70.

FIG. 6N shows the spool 25 being blown further downwards towards the top flange 31, such that the second internal valve space 71a allows fluid communication between the first fluid conduit 42 and the second exhaust port 34. Here, the first fluid conduit 42 may communicate with the second exhaust port 34 via the second internal valve space 71a. This may allow the fluid stored in the proximal chamber 62 to travel through the first fluid conduit 42, second internal valve space 71a, and the second exhaust port 34, thereby allowing the spool 25 to move further downward. In one embodiment, the spool 25 may travel between approximately 0.32" and 0.5" to allow communication between the proximal chamber 62 and second exhaust port 34. In another embodiment, the spool 25 may travel approximately 0.325" to allow communication between the proximal chamber 62 and second exhaust port 34. During this time, fluid in the first cylindrical space 177a continues to vent through first exhaust port 32 in the direction of ARROW A via the third fluid conduit 46 and first internal valve space 70a of the first slide valve 70. Additionally, pressurized fluid from the supply chamber 64 continues to travel to the second cylindrical space 177b via the second fluid conduit 44 in the direction of ARROW B. This allows the control fluid to move the piston 175 towards the bottom flange 250.

FIG. 6O shows in detail the downward movement of spool 25 after the spool 25 movement shown in FIG. 6N. Here, the first slide valve 70 preferably completely blocks the second fluid conduit 44, but does not completely block the third fluid conduit 46. Thus, during this time, the fluid in the first cylindrical space 177a continues to decay into ambient temperature by traveling to the first exhaust port 32 via the third fluid conduit 46 and the first internal valve space 70a of the first slide valve 70. Additionally, fluid in the proximal chamber 62 continues to reach ambient pressure by traveling into the first fluid conduit 42, second internal valve space 71a of the second slide valve 71, and into the second exhaust port 34. As a result, the spool 25 continues to travel downwards toward the top flange 31. This continuous shifting of the first slide valve 70 and second slide valve 71 from their second position towards their first position will preferably causes the first exhaust port 32 to be in communication with the second fluid conduit 44.

FIG. 6P shows the first slide valve 70 completely blocking the second fluid conduit 44 and third fluid conduit 46 during the down stroke of the spool 25. During this time, the first exhaust port 32 is completely blocked, and the piston 175 and valve stem 145 are preferably not moving. Fluid in the proximal chamber 62 continues to travel through the first fluid conduit 42 and through the second exhaust port 34 via the second internal valve space 71a of the second slide valve 71. This generally allows fluid in the proximal chamber 62 to exhaust, thereby allowing the spool 25 to travel downwards towards the top flange 31 until the down stroke is complete.

FIG. 6Q shows the pump assembly 100 at the end of its down stroke. As spool 25 is in the position shown in FIG. 6Q at the end of its down stroke (i.e., while the proximal end of the spool 25 is near or adjacent to the top flange 31) and the slide valves 70, 71 are in their first position, pressurized control fluid begins to communicate or travel in the direction of ARROW A from the supply chamber 64 to the first cylindrical space 177a via the third fluid conduit 46 to apply pressure against the bottom surface of piston 175 in order to move piston 175 and valve stem 145 upwards in the direction of ARROW C. During this time, the second cylindrical space 177b begins to vent to ambient pressure in the direction of ARROW B as the second cylindrical space 177b is in communication with the second fluid conduit 44, first exhaust port 32, and the internal valve space 70a of first slide valve 70 in its first position. Fluid or gas stored in the proximal chamber 62 is also preferably in communication with the first fluid conduit 42, second exhaust port 34, and the internal valve space 71a of the second slide valve 71 in its first position to vent the fluid or gas to ambient pressure. The distal chamber 66, center bore 26 of the spool valve 25, valve stem bore 150, and valve stem openings 155 of valve stem 145 are preferably in communication with the second cylindrical space 177b. Thus, fluid within the distal chamber 66 is preferably vented to ambient pressure through the center bore 26 of the spool valve 25, valve stem bore 150, valve stem openings 155, second fluid conduit 44, first internal valve space 71a of first slide valve 70, and first exhaust port 32. The process shown in FIGS. 6A through 6Q then repeats as the pump reciprocates.

D-Slide Stop Mechanism

In one embodiment of the present disclosure, when the spool moves up and down during normal pump operation, it may physically move the D-slide (referred to above as first slide valve 70) to a desired location. The pocket on the side of the spool where the D-slide may sit (referred to above as the first support groove portion 27), is preferably dimensionally longer than the D-slide itself, as shown in FIGS. 5A and 5B. When operating correctly, after a certain amount of spool movement, up or down, any gap between a side of the first support groove portion and the D-slide is eliminated and the D-slide is physically contacted by a side (or wall) of the first support groove portion. The D-slide remains fixed against this wall as the spool moves to a set position (the top or bottom end of a stroke). The end location of the spool puts the D-slide in the correct location to switch the flow of fluid within the pump. The switching effect of the spool is nearly instantaneous during the normal stroking of the pump. Depending on pressures, the properties of the fluid/gas mixture, and/or the speed of the pump, the velocity of the spool and D-slide/spool interaction may vary.

During operation of the pump assembly, there may be scenarios, such as operation of the pump at high speed, wherein it is conceivable that the D-slide may get knocked out of position by the force of the spool slamming into the D-slide. This is not desirable. This is an unwanted scenario because the venting ports may not be covered and/or exposed properly if the D-slide is out of position. This can result in a hesitation or stalling of the reciprocating pump.

To prevent the D-slide from moving substantially out of its desired position within the groove, including being knocked out of place due to possible high velocity pump movement, a stopping mechanism or portion may be added to the ported wear plate to restrict movement of the D-slide, without hindering the pump during normal operation.

Figure 7A:
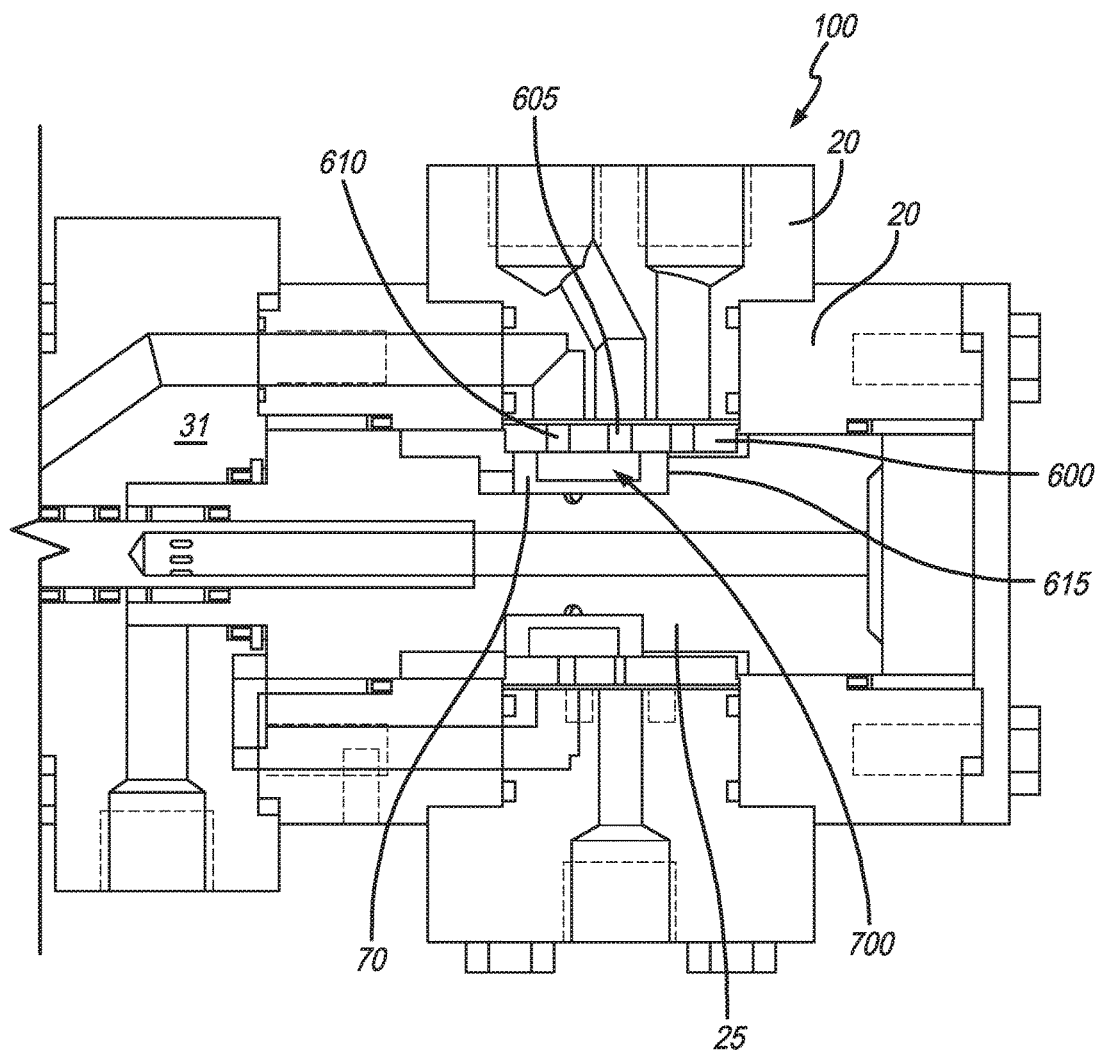
FIG. 7A is an illustration of one embodiment of the pump assembly and shows the first slide valve in the correct position at the end of a down stroke.

FIG. 7A is an illustration of one embodiment of the pump assembly and shows the first slide valve in the correct position at the end of a down stroke. As shown in FIG. 7A, the ports 605 and 610 in the ported wear plate 600 are correctly exposed 700, allowing the fluid or gas to exhaust. The first slide valve 70 is very near or touching the wall 615. FIG. 7A also shows that the ported wear plate 600 is part of and/or directly connected to the spool housing assembly 20. Preferably the ported wear plate 600 is removeable from the spool housing assembly 20 so that it can be easily replaced if it gets too worn down. But, in some embodiments, the ported wear plate is merely that portion of the spool housing assembly 20 that interacts with the first slide valve 70.

Figure 7B:
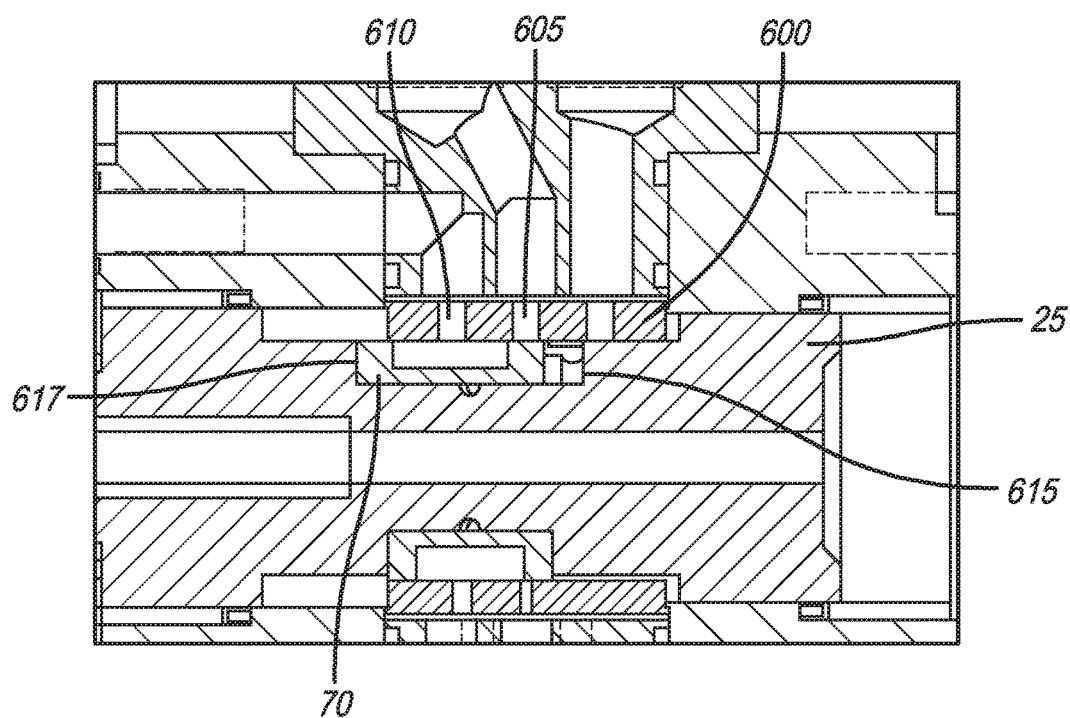
FIG. 7B is an illustration of one embodiment of the pump assembly and shows the first slide valve in an incorrect position at the end of a down stroke.

FIG. 7B is an illustration of one embodiment of the pump assembly and shows the first slide valve in an incorrect position at the end of a down stroke. FIG. 7B shows that the first slide valve 70 has been knocked away from wall 615, towards wall 617, and is now not in the correct position to allow fluid to pass through port 605 in the ported wear plate 600. FIG. 7B shows that the spool 25 is at the endo of the down stroke.

Figure 8A:
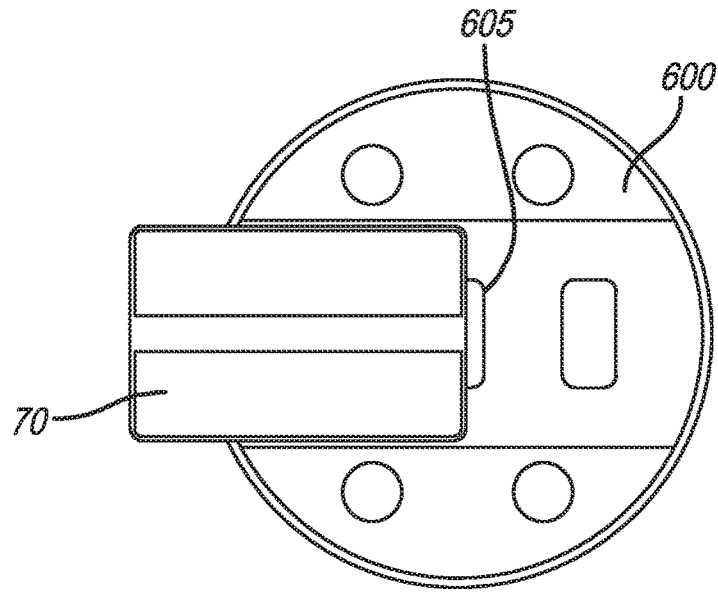
FIGS. 8A and 8B are illustration of one embodiment of the ported wear plate interacting with the first slide valve.
Figure 8B:
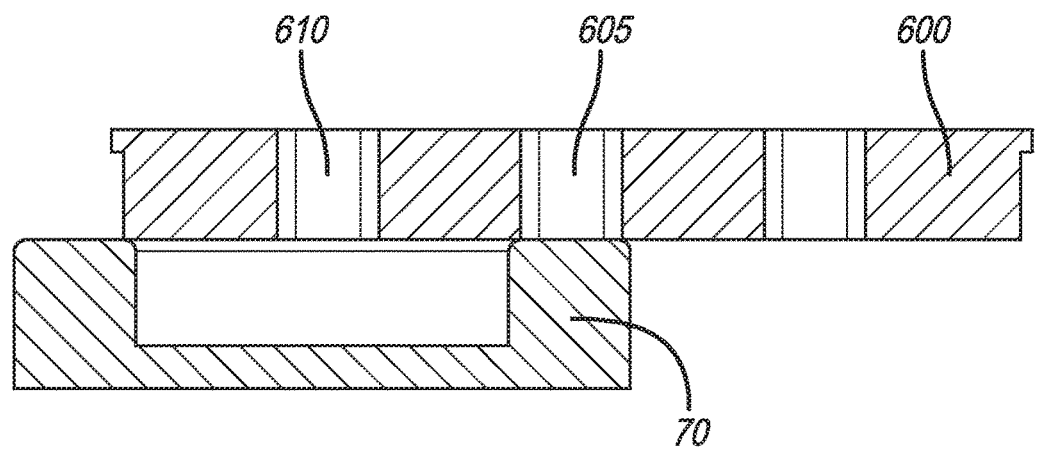

FIGS. 8A and 8B are illustrations of one embodiment of the ported wear plate interacting with one embodiment of the first slide valve. As shown in FIG. 8A, the first slide valve 70 is so out of place that port 605 is exposed, which may prevent the pump assembly from exhausting and may allow the supply fluid to exit though port 605.

As shown in FIG. 8B, the first side valve 70 is out of place and completely covering port 605 of the ported wear plate 600. In this position, gas or fluid is prevented from exiting the pump assembly through port 605.

Figure 9:
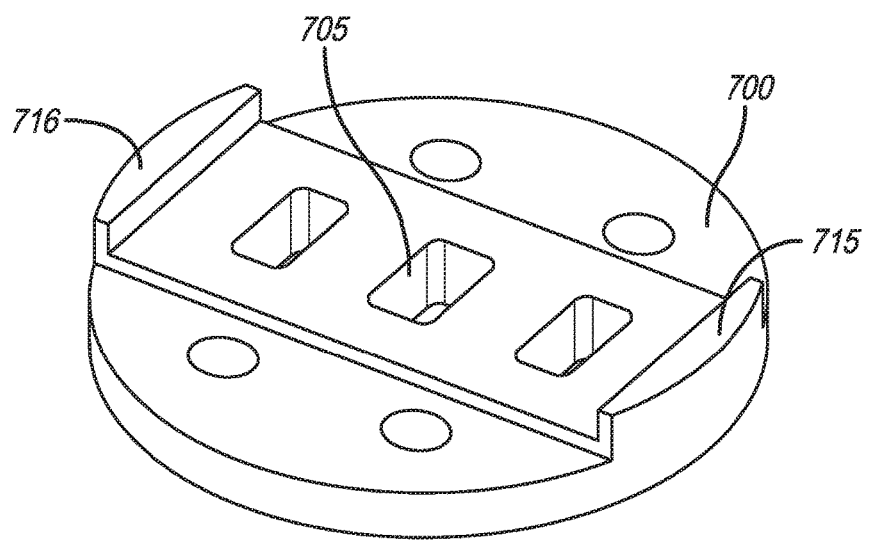
FIG. 9 is an illustration of one embodiment of a ported wear plate with stop portions.

FIG. 9 is an illustration of one embodiment of a ported wear plate with stop portions. As shown in FIG. 9, in order to prevent the first slide valve 70 from being knocked out of place, the ported wear plate 700 may have stop tabs 715, 716. FIG. 9 also shows the ports 705.

Figure 10A:
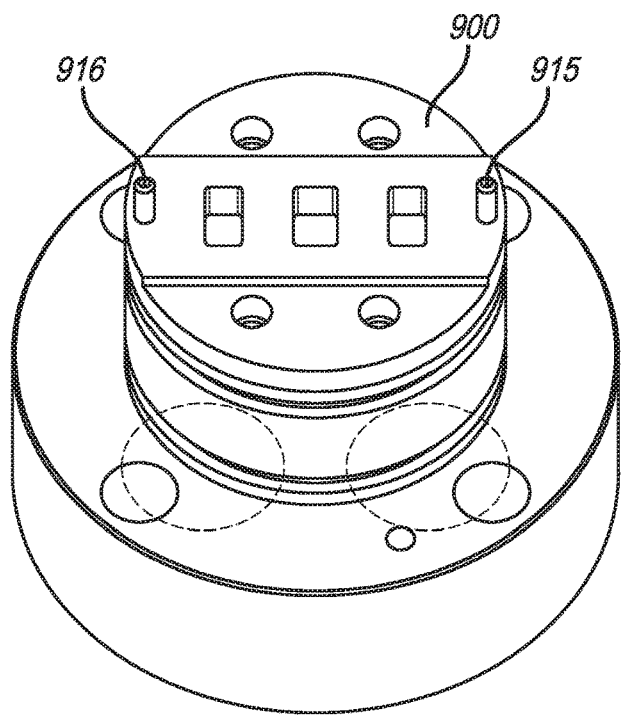
FIG. 10A is an illustration of another embodiment of a ported wear plate with stop portions.

FIG. 10A is an illustration of another embodiment of a ported wear plate with stop portions. As shown in FIG. 10, the ported wear plate 900 may have stop pins 915, 916, which are stop portions that may prevent the first slide valve from going out of place.

Figure 10B:
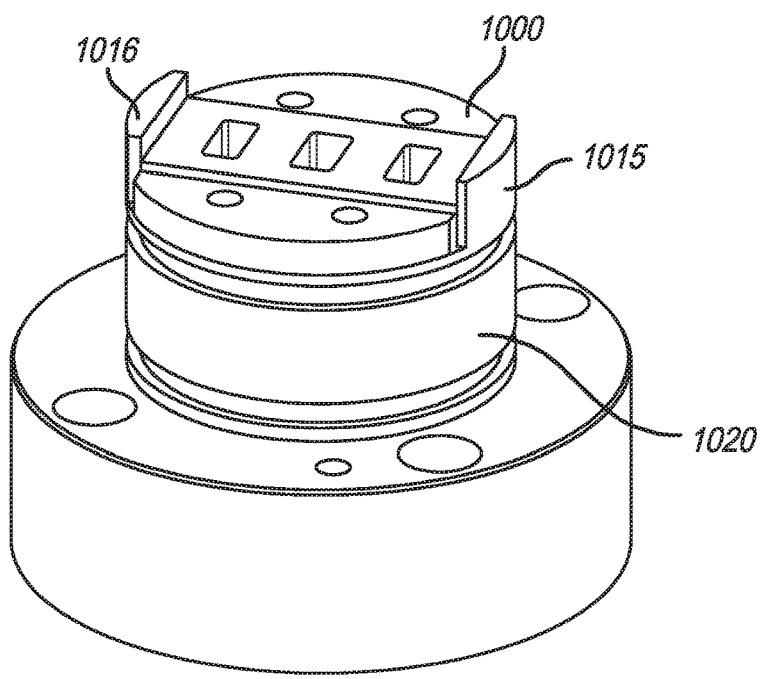
FIG. 10B is an illustration of another embodiment of a ported wear plate and spool housing assembly with stop portions.

FIG. 10B is an illustration of another embodiment of a ported wear plate and spool housing assembly with stop portions. As shown in FIG. 10B, the spool housing assembly 1020 may comprise a ported wear plate 1000, which may be part of, permanently fixed to, or removably fixed to spool housing assembly 1020. FIG. 10B shows that on the longitudinal ends of the ported wear plate 1000, the spool housing assembly 1020 comprises stop portions 1015, 1016, which may prevent the first slide valve from going out of place.

Figure 11:
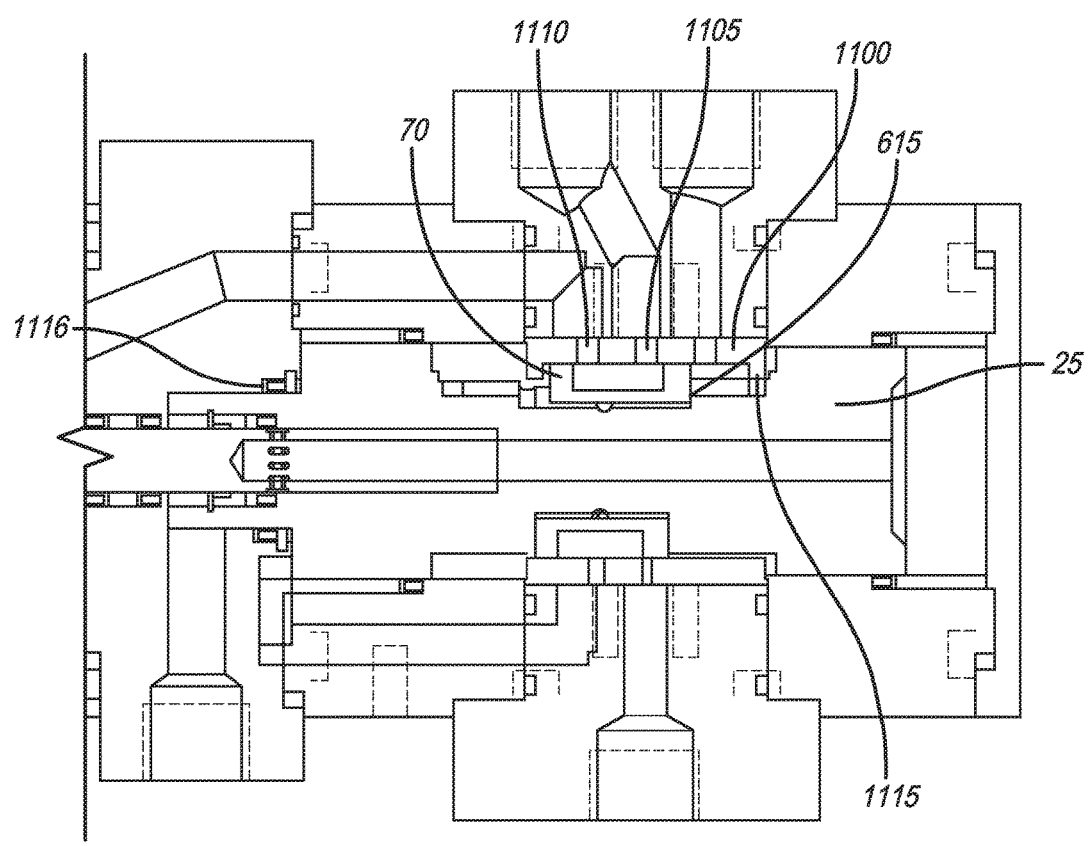
FIG. 11 is an illustration of a pump assembly, wherein the ported wear plate has stop portions.

FIG. 11 is an illustration of a pump assembly, wherein the ported wear plate has stop portions. As shown in FIG. 11, the spool 25 is at the end of a down stroke and the first slide valve 70 is in its proper place against wall 615. Ports 1110 and 1105 are able to vent fluid or gas. First slide valve 70 is prevented from moving out of place by stop portion 1116. As shown, stop portions 1116, 1115 do not interfere with the normal pump operation of spool 25. Although shown as part of ported wear plate 1100, stop portions 1115, 1116 may be part of the spool housing assembly, just as the ported wear plate 1100 may be part of the spool housing assembly. It should be understood that stop portions 1115, 1116 may be a variety of different shapes and sizes, so long as the slide valve 70 is prevented from being out of position and the operation of spool 25 is not interrupted. Stop portions 1115, 1116, and/or ported wear plate 1100 may be part of or connected to the spool housing assembly.

Figure 12:
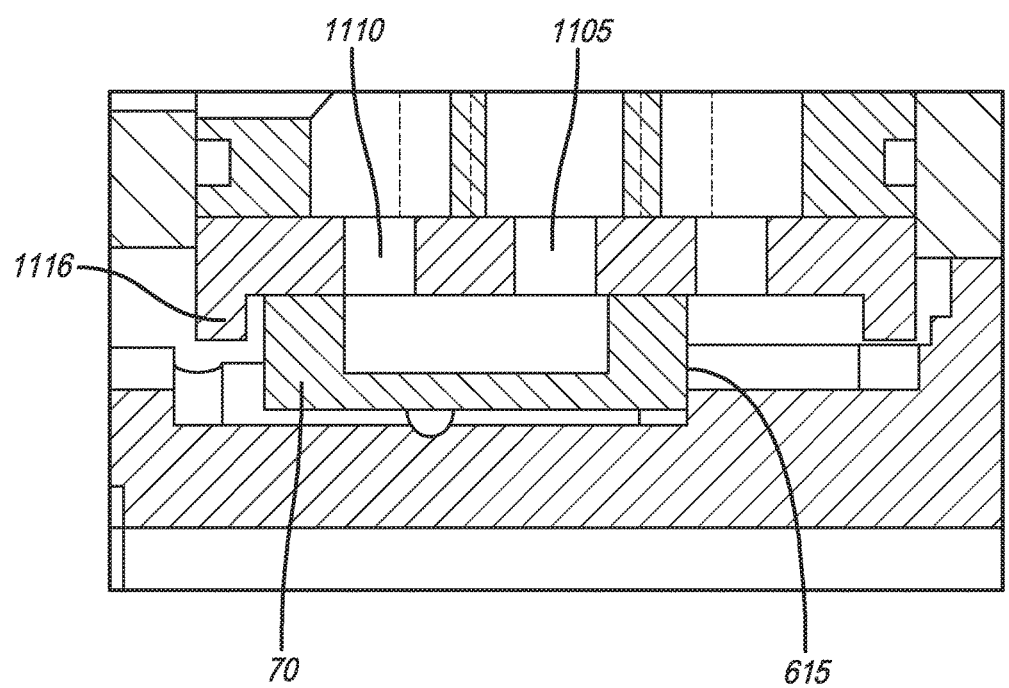
FIG. 12 is close-up illustration of a pump assembly, wherein the ported wear plate has stop portions.

FIG. 12 is close-up illustration of a pump assembly, wherein the ported wear plate has stop portions. As shown in FIG. 11, the first slide valve 70 is in its proper place against wall 615. Ports 1110 and 1105 are able to vent fluid or gas. First slide valve 70 has been prevented from moving out of place by stop portion 1116.

Unless otherwise stated, all measurements, values, ratings, positions, magnitudes, sizes, locations, and other specifications that are set forth in this specification, including in the claims that follow, are approximate, not exact. They are intended to have a reasonable range that is consistent with the functions to which they relate and with what is customary in the art to which they pertain.

The foregoing description of the preferred embodiment has been presented for the purposes of illustration and description. While multiple embodiments are disclosed, still other embodiments will become apparent to those skilled in the art from the above detailed description. These embodiments are capable of modifications in various obvious aspects, all without departing from the spirit and scope of protection. Accordingly, the detailed description is to be regarded as illustrative in nature and not restrictive. Also, although not explicitly recited, one or more embodiments may be practiced in combination or conjunction with one another. Furthermore, the reference or non-reference to a particular embodiment shall not be interpreted to limit the scope of protection. It is intended that the scope of protection not be limited by this detailed description, but by the claims and the equivalents to the claims that are appended hereto.

Except as stated immediately above, nothing that has been stated or illustrated is intended or should be interpreted to cause a dedication of any component, step, feature, object, benefit, advantage, or equivalent, to the public, regardless of whether it is or is not recited in the claims.

What is claimed is:

1. A pump assembly, comprising:
   a motor portion;
   wherein said motor portion comprises: a spool and a spool housing assembly comprises a spool chamber;
   wherein said spool is disposed in and reciprocally movable within said spool chamber and comprises an upper portion and a lower portion;
   wherein said spool housing assembly comprises: a first seal and a second seal;
   wherein, when said spool is disposed within said spool chamber of said spool housing assembly, said first seal and said second seal divide said spool chamber into a proximal chamber, a supply chamber, and a distal chamber, respectively, such that:
   (i) said first seal divides said spool chamber into said proximal chamber and said supply chamber; and
   (ii) said second seal divides said spool chamber into said supply chamber and said distal chamber; and
   wherein a diameter of a lower portion of said spool is approximately 3 to 8 percent larger than a diameter of an upper portion of said spool.

2. The pump assembly of claim 1, wherein said diameter of said lower portion of said spool is approximately 4 percent larger than said diameter of said upper portion of said spool.

3. The pump assembly of claim 1, wherein said spool comprises a first support groove portion adapted to cradle a first slide valve; and
   wherein a width of said first support groove portion is approximately the same as a width of said first slide valve, such that said first support groove portion substantially prevents said first slide valve from moving laterally within said first support groove portion.

4. The pump assembly of claim 3, wherein said spool comprises a first spool bore; and
   wherein said first spool bore traverses laterally through said first support groove portion, such that said first slide valve is in fluid communication with said first spool bore when said first support groove cradles said first slide valve.

5. The pump assembly of claim 4, wherein a length of said first support groove portion is longer than a length of said first slide valve, such that said first support groove portion allows said first slide valve to move longitudinally within said first support groove portion.

6. The pump assembly of claim 5, wherein said spool comprises a second support groove portion adapted to cradle a second slide valve; and
   wherein a width and a length of said second support groove portion is approximately the same as a width and a length of said second slide valve, such that said second support groove portion prevents said second slide valve from moving either laterally or longitudinally within said second support groove portion.

7. The pump assembly of claim 6, wherein said spool comprises a second spool bore; and
   wherein said second spool bore traverses laterally through said second support groove portion, such that said second slide valve is in fluid communication with said second spool bore when said second support groove cradles said second slide valve.

8. The pump assembly of claim 7, wherein said spool housing assembly further comprises a ported wear plate;
   wherein said first slide valve moves longitudinally against said ported wear plate; and
   wherein said ported wear plate comprises one or more stop portions that prevent said first slide valve from being out of position relative to said ported wear plate.

9. The pump assembly of claim 1, wherein said spool comprises a center bore that is adapted to moveably receive a valve stem of a piston of said pump assembly, said center bore being in fluid communication with said distal chamber of said spool housing assembly;
   wherein said valve stem comprises a valve stem bore and one or more valve stem openings;
   wherein said one or more valve stein openings are tapered such that a shape of said one or more valve stem openings inwardly slopes into said valve stem bore; and
   wherein said center bore, said valve stem bore; and said one or more valve stem openings are in fluid communication with each other.

10. A pump assembly, comprising:
    a motor portion adapted to drive a fluid pumping portion via a piston;
    wherein said motor portion comprises: a spool and a spool housing assembly comprises a spool chamber;
    wherein said spool is disposed in and reciprocally movable within said spool chamber and comprises an upper portion and a lower portion;
    wherein said spool housing assembly comprises: a first seal and a second seal;

wherein said first seal is located inside said spool chamber and disposed between said lower portion of said spool and said spool housing assembly;

wherein said second seal is located inside said spool chamber and disposed between said upper portion of said spool and said spool housing assembly;

wherein, when said spool is disposed within said spool chamber of said spool housing assembly, said first seal and said second seal divide said spool chamber into a proximal chamber, a supply chamber, and a distal chamber, respectively, such that:
 (i) said first seal divides said spool chamber into said proximal chamber and said supply chamber; and
 (ii) said second seal divides said spool chamber into said supply chamber and said distal chamber; and wherein a diameter of a lower portion of said spool is approximately 3 to 8 percent larger than a diameter of an upper portion of said spool.

11. The pump assembly of claim 10, wherein said diameter of said lower portion of said spool is approximately 4 percent larger than said diameter of said upper portion of said spool.

12. The pump assembly of claim 10; wherein said spool comprises a first support groove portion adapted to cradle a first slide valve; and
 wherein a width of said first support groove portion is approximately the same as a width of said first slide valve, such that said first support groove portion substantially prevents said first slide valve from moving laterally within said first support groove portion.

13. The pump assembly of claim 12; wherein said spool comprises a first spool bore; and
 wherein said first spool bore traverses laterally through said first support groove portion, such that said first slide valve is in fluid communication with said first spool bore when said first support groove cradles said first slide valve.

14. The pump assembly of claim 13, wherein a length of said first support groove portion is longer than a length of said first slide valve, such that said first support groove portion allows said first slide valve to move longitudinally within said first support groove portion.

15. The pump assembly of claim 14; wherein said spool comprises a second support groove portion adapted to cradle a second slide valve; and
 wherein a width and a length of said second support groove portion is approximately the same as a width and a length of said second slide valve, such that said second support groove portion prevents said second slide valve from moving either laterally or longitudinally within said second support groove portion.

16. The pump assembly of claim 15, wherein said spool comprises a second spool bore; and
 wherein said second spool bore traverses laterally through said second support groove portion, such that said second slide valve is in fluid communication with said second spool bore when said second support groove cradles said second slide valve.

17. The pump assembly of claim 10, wherein said spool comprises a center bore that is adapted to moveably receive a valve stem of said piston, said center bore being in fluid communication with said distal chamber of said spool housing assembly;
 wherein said valve stem comprises a valve stem bore and one or more valve stem openings;

wherein said one or more valve stem openings are tapered, such that a shape of said one or more valve stem openings inwardly slopes into said valve stem bore; and wherein said center bore, said valve stem bore, and said one or more valve stem openings are in fluid communication with each other.

18. The pump assembly of claim 17, wherein said spool comprises a spool seal located near a lower portion of said spool;
 wherein said spool seal is disposed between said valve stem of said piston and said lower portion of said spool; and
 wherein said one or more valve stem openings of said valve stem are adapted to never contact and pass said spool seal when said valve stem reciprocally moves within said center bore of said spool.

19. The pump assembly of claim 18, wherein said spool housing assembly further comprises a ported wear plate and one or more stop portions;
 wherein said first slide valve moves longitudinally against said ported wear plate; and
 wherein said one or more stop portions prevent said first slide valve from being out of position relative to said ported wear plate.

20. A pump assembly, comprising:
 a motor portion and a fluid pumping portion;
 wherein said motor portion is adapted to drive said fluid pumping portion via a piston;
 wherein said motor portion comprises: a spool and a spool housing assembly comprises a spool chamber;
 wherein said spool is disposed in and reciprocally movable within said spool chamber and comprises an upper portion and a lower portion;
 wherein said spool housing assembly comprises: a first seal and a second seal;
 wherein said first seal is located inside said spool chamber and disposed between said lower portion of said spool and said spool housing assembly;
 wherein said second seal is located inside said spool chamber and disposed between said upper portion of said spool and said spool housing assembly;
 wherein, when said spool is disposed within said spool chamber of said spool housing assembly, said first seal and said second seal divide said spool chamber into a proximal chamber, a supply chamber, and a distal chamber, respectively, such that:
  (i) said first seal divides said spool chamber into said proximal chamber and said supply chamber; and
  (ii) said second seal divides said spool chamber into said supply chamber and said distal chamber; and
 wherein said diameter of said lower portion of said spool is approximately 4 percent larger than said diameter of said upper portion of said spool;
 wherein said spool comprises a first support groove portion, a second support groove portion, a first spool bore, and a second spool bore;
 wherein said first support groove portion is adapted to cradle a first slide valve;
 wherein a width of said first support groove portion is approximately the same as a width of said first slide valve, such that said first support groove portion substantially prevents said first slide valve from moving laterally within said first support groove portion;
 wherein a length of said first support groove portion is longer than a length of said first slide valve, such that said first support groove portion allows said first slide valve to move longitudinally within said first support groove portion;

wherein said first spool bore traverses laterally through said first support groove portion, such that said first slide valve is in fluid communication with said first spool bore when said first support groove cradles said first slide valve;

wherein said second support groove portion is adapted to cradle a second slide valve;

wherein a width and a length of said second support groove portion is approximately the same as a width and a length of said second slide valve, such that said second support groove portion prevents said second slide valve from moving either laterally or longitudinally within said second support groove portion;

wherein said second spool bore traverses laterally through said second support groove portion, such that said second slide valve is in fluid communication with said second spool bore when said second support groove cradles said second slide valve;

wherein said spool comprises a center bore and a spool seal;

wherein said center bore of said spool is adapted to moveably receive a valve stem of said piston, said center bore being in fluid communication with said distal chamber of said spool housing assembly;

wherein said valve stem comprises a valve stem bore and one or more valve stem openings;

wherein said one or more valve stem openings are tapered, such that a shape of said one or more valve stem openings inwardly slopes into said valve stem bore;

wherein said center bore, said valve stem bore, and said one or more valve stem openings are in fluid communication with each other;

wherein said spool seal is located near a lower portion of said spool;

wherein said spool seal is disposed between said valve stem of said piston and said lower portion of said spool; and wherein said one or more valve stem openings of said valve stem are adapted to never contact and pass said spool seal when said valve stem reciprocally moves within said center bore of said spool.

21. A pump assembly, comprising:
a motor portion;
wherein said motor portion comprises: a spool and a spool housing assembly;
wherein said spool housing assembly comprises: a first seal, a second seal, a spool chamber, a ported wear plate, and one or more stop portions;
wherein said spool is disposed in and reciprocally movable within said spool chamber and comprises an upper portion and a lower portion;
wherein, when said spool is disposed within said spool chamber of said spool housing assembly, said first seal and said second seal divide said spool chamber into a proximal chamber, a supply chamber, and a distal chamber, respectively, such that:

(iii) said first seal divides said spool chamber into said proximal chamber and said supply chamber; and
(iv) said second seal divides said spool chamber into said supply chamber and said distal chamber; and wherein said spool comprises a first support groove portion adapted to cradle a first slide valve;

wherein a width of said first support groove portion is approximately same as a width of said first slide valve, such that said first support groove portion substantially prevents said first slide valve from moving laterally within said first support groove portion;

wherein a length of said first support groove portion is longer than a length of said first slide valve, such that said first support groove portion allows said first slide valve to move longitudinally within said first support groove portion;

wherein said first slide valve moves longitudinally against said ported wear plate; and wherein said one or more stop portions prevent said first slide valve from being out of position relative to said ported wear plate.

22. The pump assembly of claim 21, wherein said spool comprises a first spool bore; and wherein said first spool bore traverses laterally through said first support groove portion, such that said first slide valve is in fluid communication with said first spool bore when said first support groove cradles said first slide valve.

23. The pump assembly of claim 22, wherein said spool comprises a second support groove portion adapted to cradle a second slide valve; and wherein a width and a length of said second support groove portion is approximately the same as a width and a length of said second slide valve, such that said second support groove portion prevents said second slide valve from moving either laterally or longitudinally within said second support groove portion.

24. The pump assembly of claim 23, wherein said spool comprises a second spool bore; and wherein said second spool bore traverses laterally through said second support groove portion, such that said second slide valve is in fluid communication with said second spool bore when said second support groove cradles said second slide valve.

25. The pump assembly of claim 21, wherein a diameter of a lower portion of said spool is larger than a diameter of an upper portion of said spool.

26. The pump assembly of claim 25, wherein said diameter of said lower portion of said spool is between approximately 3 to 8 percent larger than said diameter of said upper portion of said spool.

27. The pump assembly of claim 26, wherein said diameter of said lower portion of said spool is approximately 4 percent larger than said diameter of said upper portion of said spool.

28. The pump assembly of claim 21 wherein said one or more stop portions are part of said ported wear plate.

29. The pump assembly of claim 21 wherein said one or more stop portions are stop pins that are connected to said ported wear plate.

* * * * *